(12) United States Patent
Duling et al.

(10) Patent No.: US 9,094,149 B1
(45) Date of Patent: *Jul. 28, 2015

(54) MEDIA STREAM DISTRIBUTION SYSTEM

(75) Inventors: Irl N. Duling, Lancaster, PA (US); Sandeep T. Vohra, Ellicot City, MD (US); Paul J. Matthews, Ellicot City, MD (US)

(73) Assignee: ARRIS Enterprises, Inc., Suwanee, GA (US)

( * ) Notice: Subject to any disclaimer, the term of this patent is extended or adjusted under 35 U.S.C. 154(b) by 720 days.

This patent is subject to a terminal disclaimer.

(21) Appl. No.: 13/252,678

(22) Filed: Oct. 4, 2011

Related U.S. Application Data

(63) Continuation of application No. 10/365,619, filed on Feb. 13, 2003, now Pat. No. 8,032,016, and a continuation-in-part of application No. 10/266,930, filed on Oct. 9, 2002, now abandoned, and a continuation-in-part of application No. 10/267,045, filed on Dec. 20, 2002, now abandoned.

(60) Provisional application No. 60/355,815, filed on Feb. 13, 2002.

(51) Int. Cl.
*H04J 14/00* (2006.01)
*H04J 14/02* (2006.01)

(52) U.S. Cl.
CPC .................. *H04J 14/0227* (2013.01)

(58) Field of Classification Search
CPC . H04J 14/0227; H04J 14/0228; H04J 14/023; H04J 14/0232; H04J 14/0235; H04J 14/0238; H04J 14/0241; H04J 14/0242; H04J 14/0245; H04J 14/0246; H04J 14/0249
USPC .......... 398/66, 67, 68, 69, 70, 71, 72, 75, 76, 398/79, 59, 98, 99, 100, 115, 74, 73, 60, 398/183, 187, 135, 89; 370/352, 392, 389, 370/468, 465, 474; 725/105, 106, 125, 127, 725/129

See application file for complete search history.

(56) References Cited

U.S. PATENT DOCUMENTS

| 5,202,780 | A | 4/1993 | Fussanger |
| 5,659,351 | A | 8/1997 | Huber |
| 6,147,786 | A | 11/2000 | Pan |
| 6,577,414 | B1 | 6/2003 | Feldman et al. |
| 6,751,417 | B1 * | 6/2004 | Combs et al. .................. 398/71 |
| 7,046,933 | B2 | 5/2006 | Tomioka |
| 8,032,016 | B1 * | 10/2011 | Duling et al. .................. 396/72 |
| 2001/0030785 | A1 * | 10/2001 | Pangrac et al. ............... 359/125 |
| 2003/0079233 | A1 | 4/2003 | Matthews et al. |
| 2003/0128718 | A1 | 7/2003 | Matthews et al. |

* cited by examiner

*Primary Examiner* — Hanh Phan
(74) *Attorney, Agent, or Firm* — Troy A. Van Aacken

(57) ABSTRACT

An arrangement is provided for transporting information from a central information distribution center (CIDC) to locations where such information is intended. Upon receiving a request for narrowcast information to be delivered to a node associated with a head end, the CIDC selects the requested information, generates an optical signal encoded with the requested information using information channels dedicated to narrowcast information transport for the node, and sends the optical signal to the head end via an optical fiber. When the head end receives the optical signal, the narrowcast information transport channels dedicated to the node are translated into subcarriers acceptable to the node before the requested narrowcast information is forwarded to the node.

19 Claims, 20 Drawing Sheets

MEDIA STREAM DISTRIBUTION SYSTEM

This Application is based on Provisional Application No. 60/355,815 filed Feb. 13, 2002, the entire contents of which is hereby incorporated by reference. In addition, two U.S. Utility patent applications, one with U.S. patent application Ser. No. 10/266,930 filed Oct. 9, 2002 and entitled "Method For Consolidation of Services, Equipment, and Content Using Spectrally Efficient Transport" and the other with U.S. patent application Ser. No. 10/267,045, filed Oct. 9, 2002 entitled "Method For Switching And Routing Large Bandwidth Continuous Data Streams From A Centralized Location", are incorporated herein by reference.

BACKGROUND

1. Field of Invention

The present invention relates to information distribution architectures and arrangements for transporting narrowcast information from a central location via an optical fiber.

2. Discussion of Related Art

Currently, many industries such as cable television (CATV), use proprietary hybrid fiber-coax (HFC) architectures to service a given metropolitan area. As technology has evolved, the trend in system design is to consolidate services, equipment, and information, further upstream, to effect savings in space, cost, and maintenance. Previous implementations have most of the information and equipment concentrated at hub sites due to difficulties in distributing the information. In contrast, recent architectures consolidate equipment and information sources (e.g., satellites, video servers, IP routers, or reception antennas) at so called "head end", "master head end", or "regional head-end" structures, that are upstream of hubs. Such architectures allow aggregation of resources which subsequently results in better efficiency, increased service offerings, and increased revenues for the CATV industry.

Further aggregation of services and information beyond a given metropolitan region is inherently advantageous in light of the continuing demand for information and subsequent capital equipment costs for real-time services such as video on demand. Aggregated information may be typically transported over fiber-optic lines to be broadcast to all linked head ends. One impediment to utilizing this scheme of continued consolidation of equipment and information sources is the requirement of dynamically delivering information to locations (or head ends) where the information is requested in a cost effective manner. Such information that is delivered to an individual, or a group of individuals such as a node or a head end is referred to as "narrowcast" content. Therefore, there is a need for an efficient information delivery scheme, by which information, including broadcast and narrowcast information, can be dynamically transported to where it is desired in an efficient and cost effective way.

SUMMARY

In accordance with the present invention, a method is provided for distributing information, including both broadcast and narrowcast information, from a central information distribution center which provides consolidated information acquired from different sources. To distribute information to a plurality of head ends, a central information distribution center distributes information, either broadcast or narrowcast, using dedicated carriers allocated to different nodes, different head ends, and different types of content based on a carrier allocation scheme.

In one embodiment, carriers dedicated to narrowcast information transport may include RF subcarriers and optical carriers. Carriers dedicated to narrowcast information transport are designated to different nodes of different head ends to enable efficient and cost effective information transport. Each node may be designated a plurality of RF subcarriers for narrowcast information transport. For example, when a node accepts five target subcarriers for narrowcast information, five corresponding RF subcarriers may be dedicated to the node for transporting the narrowcast information requested by the node from a central information distribution center to the node.

Subcarriers of different frequency ranges may be designated to different nodes. For example, a group of five adjacent RF subcarriers in a range from 100 MHz to 124 MHz, each of which has a bandwidth of 6 MHz, may be dedicated to a first node of a head end. Another group of five adjacent RF subcarriers in a range from 130 MHz to 154 MHz, each of which also has a bandwidth of 6 MHz, may be dedicated to a second node of the same head end. Furthermore, a next group of five adjacent RF subcarriers in a range from 160 MHz to 184 MHz may be dedicated to a first node of a second head end.

To aggregate information, subcarriers dedicated to different nodes of either the same head end or different head ends may be multiplexed to generate a single RF signal, which may be subsequently up-converted onto an optical carrier dedicated to transport narrowcast information. To achieve further aggregation, a plurality of optical channels encoded with narrowcast information for different nodes in different subcarriers may be multiplexed to generate a wavelength division multiplexed optical signal. With wavelength division multiplexing, the same range of available subcarriers corresponding to different wavelength channels can be dedicated to different groups of nodes for narrowcast information transport.

In some embodiments, to transport narrowcast information selected according to a user's request, a central information distribution center routes or switches the narrowcast information to appropriate channels that are dedicated to transport narrowcast information to the node responsible for the user. Narrowcast information encoded using the dedicated channels is then sent to the head end connecting to the node. Upon receiving the optical signal, the head end may translate the channels dedicated to transport the narrowcast information into target channels accepted by the node before forwarding the narrowcast information to the node. The translation between a dedicated transport channel and a target channel can be either upward or downward.

In one embodiment, RF subcarriers dedicated to a node for narrowcast information transport may be adjacent. In another embodiment, RF subcarriers dedicated to a node for narrowcast information transport may be non-adjacent. In another different embodiment, some RF subcarriers may be adjacent and some may not. In addition, subcarriers dedicated for narrowcast information transport may not have the same bandwidth.

In a different embodiment, the central information distribution center is also constructed to direct broadcast information to different head ends using carrier(s) dedicated to broadcast information transport. In this embodiment, to distribute broadcast information to all head ends, broadcast information is switched or routed to the dedicated broadcast information channel before it is encoded and sent to different head ends via an optical transmission fiber.

In another different embodiment, the central information distribution center is constructed to distribute both broadcast information and narrowcast information. According to this embodiment, the broadcast information is transmitted to different head ends using subcarriers dedicated to broadcast information transport. Narrowcast information requested by different nodes is transmitted to one or more appropriate head ends using information transport subcarriers dedicated to these head ends. Subcarriers encoded with narrowcast information and subcarriers encoded with broadcast information may be multiplexed onto either a single optical channel or separate optical channels.

In accordance with another aspect of the invention, a head end receiving an optical signal over an optical transmission fiber includes an optical filter designed for receiving information transmitted via information channel(s) dedicated to the head end. The received information may include both broadcast information and narrowcast information requested by one or more nodes connected to the head end. A head end may additionally include a subcarrier filter to select RF subcarriers dedicate to transport narrowcast information to its nodes. Such filtering may be done in either electric domain or in optical domain. Furthermore, when multiple nodes have the same target subcarriers for narrowcast information, the head end may include a translation unit responsible for translating subcarriers dedicated to transport narrowcast content to different nodes into appropriate target subcarriers required by the nodes.

In other embodiments, the information distribution scheme according to the present invention can be applied to consolidated information distribution in frameworks having other different system configurations, which include, but are not limited to, a fault tolerant consolidated information distribution framework in a linear arrangement, in a star arrangement, and in a ring arrangement. In a fault tolerant system configuration, more than one central information distribution centers may be deployed. In applying the information distribution scheme according to the present invention in those frameworks, a head end is capable of simultaneously forwarding a request for narrowcast content to different central information distribution centers and dynamically determining to receive information from an operational central information distribution center.

BRIEF DESCRIPTION OF THE DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

DETAILED DESCRIPTION

The present invention involves a consolidated information distribution system, wherein a central information distribution center consolidates resources and effectively distributes information, both broadcast and narrowcast information, via an optical fiber, to a plurality of nodes connected to a plurality of head ends. A head end may serve as many as a million subscribers, whereas a node may serve about 100 to 1000 subscribers. The central information distribution center delivers information to nodes of different head ends using dedicated carriers.

Dedicated carriers include both RF subcarriers and optical carriers. Carriers are allocated according to a scheme that facilitates efficient and cost effective information transport. Based on such a carrier allocation scheme, certain carriers may be dedicated to nodes for narrowcast content. For each node connected to a head end, a number of carriers may be dedicated for narrowcast information delivery. Under the same scheme, some carriers may be dedicated for delivering broadcast content to all nodes.

RF subcarriers dedicated to a node for narrowcast information may be adjacent or non-adjacent in the frequency domain. Different subcarriers may have the same or different bandwidth. The frequencies associated with the subcarriers dedicated to a node for the transport of narrowcast content may not be the same as the target subcarrier frequencies that the node accepts. To deliver narrowcast information to a requesting node within its acceptable range of target subcarrier frequencies, the subcarriers dedicated for transportation of narrowcast content can be translated to the target subcarriers of the node before the requested narrowcast information is forwarded to the node.

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, computer-readable media may comprise any form of data storage mechanism, including such existing memory technologies as well as hardware or circuit representations of such structures and of such data.

Figure 1:
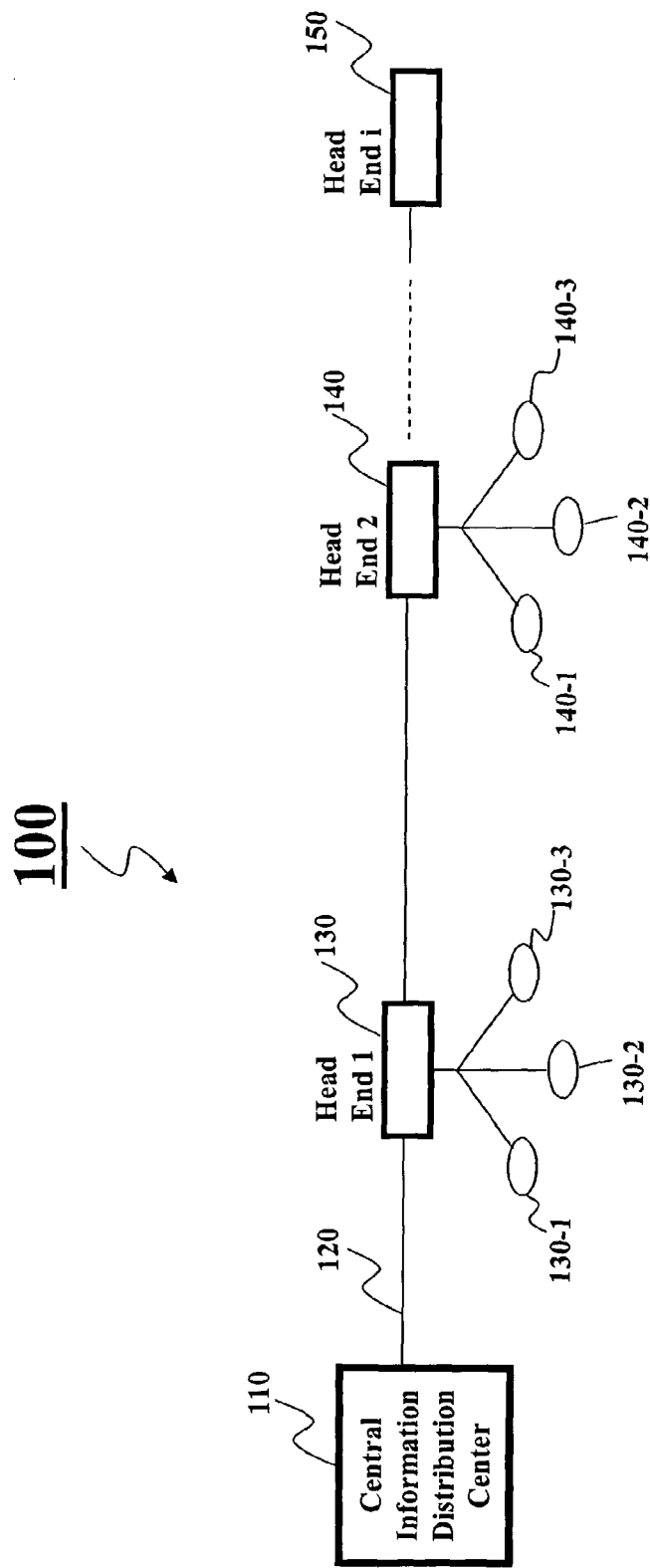
FIG. 1 depicts a first exemplary consolidated information delivery framework according to an embodiment of the present invention.

FIG. 1 depicts a first exemplary consolidated information delivery framework 100, according to an embodiment of the present invention. The framework 100 comprises a central information distribution center (CIDC) 110, a plurality of head ends (head end 1 130, head end 2 140, . . . , and head end i 150), and an optical fiber 120 that connects the CIDC 110 and the head ends 130, 140, . . . , 150. The head ends 130, 140, . . . , 150 in framework 100 are connected via the optical fiber 120 in a serial fashion. The CIDC 110 sends content data, encoded as an optical signal, via the optical fiber 120 or hybrid fiber coax (HFC) to the head ends 130, 140, . . . , 150.

The optical signal may be a single optical signal that has a plurality of wavelength channels in a wavelength division multiplexed transmission line. It may also include strings of information that have been subcarrier multiplexed. These possible embodiments will be described in more detail below. The optical signal from the CIDC 110 travels along in the direction from the first head end to the last head end. That is, the optical signal reaches the head end 1 130 first, the head end 2 140 second, . . . , and the head end i 150 the last.

Each of the head ends may be a master head end or a regional head end and may connect to a plurality of nodes. For example, the head end 1 130 includes nodes 130-1, 130-2, . . . , 130-3 and the head end 2 140 includes nodes 140-1, 140-2, . . . , 140-3. Each head end distributes content data to its own nodes. Each of such nodes may be responsible for distributing content data to a plurality of sites (not shown) which may correspond to residential homes. Different head ends may distribute different contents to their nodes. In addition, each node may distribute different content to the sites for which it is responsible.

The CIDC 110 consolidates equipment that is necessary for a variety of purposes. Content may be acquired from different sources via some network, which may include a proprietary network, a cable network, a satellite network, a wireless network, or the Internet. Different equipment may be required to receive content data from different networks. For example, to receive content from a satellite, one or more satellite dishes may be required. Content may also be generated at the CIDC 110. In this case, storage units may be needed to store content and servers may become necessary to manage such storage units. Furthermore, to distribute content to the head ends 130, 140, . . . , 150 via the optical fiber 120, the CIDC 110 also includes equipment capable of encoding content data in an optical signal.

The CIDC 110 may distribute content to head ends in different modes. For example, some content may be distributed in a broadcast mode. Such a mode may be employed when the content distributed in this mode is to be broadcast to all nodes of all head ends. Another mode of content delivery is narrowcast mode. This mode may be employed when content is delivered to less than all subscribers such as to particular subscribers based on demand. In this mode of operation, a user served by a head end may make a request for particular content. Such a request may be transmitted upstream from the user to a node responsible for the user, a head end connecting to the node, and to the CIDC 110. The CIDC 110, upon receiving the request, selects the desired content and then sends the content to the user via the head end and the node that are responsible to the user in a narrowcast delivery mode.

Figure 2A:
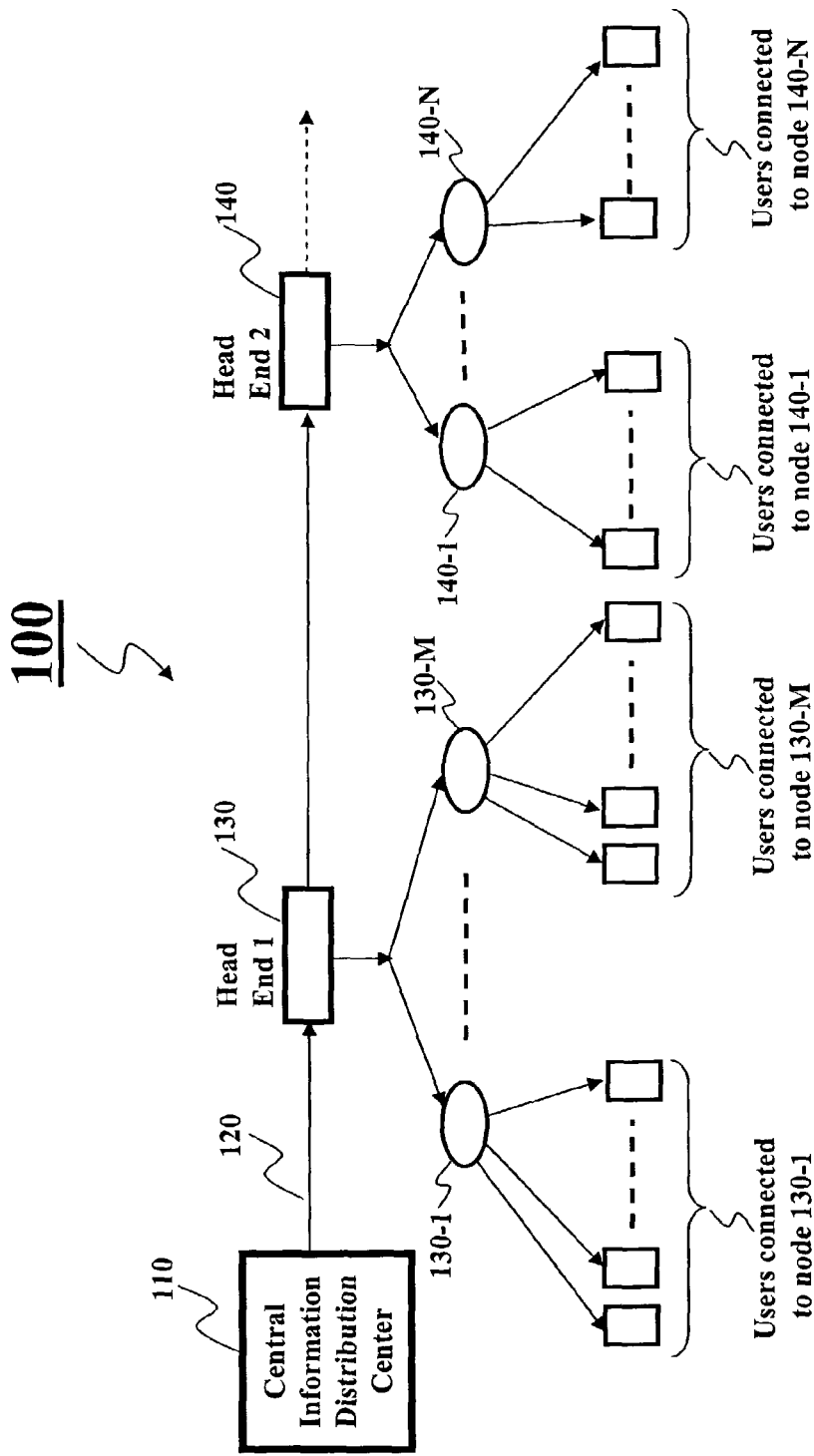
FIG. 2(a) describes broadcast information delivery in an exemplary consolidated information delivery framework.
Figure 2B:
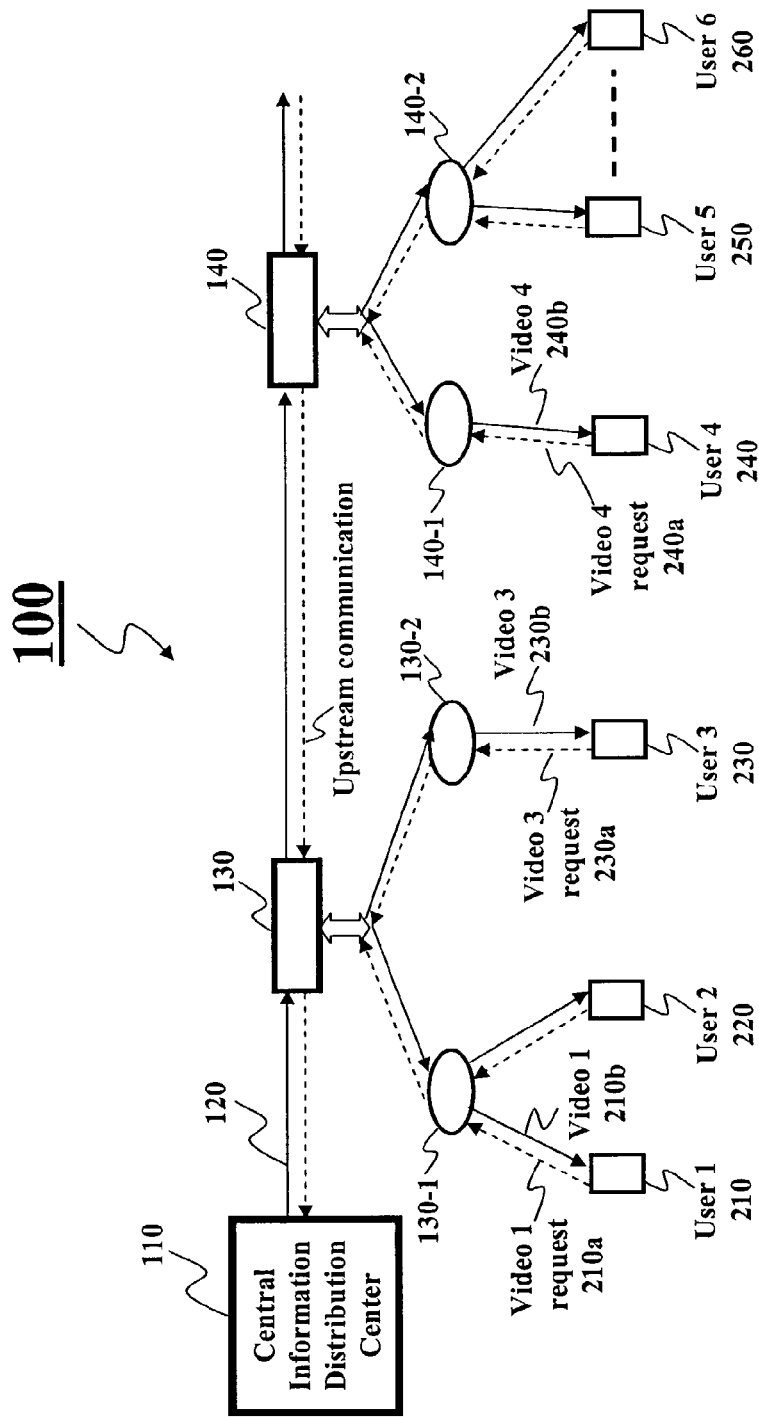
FIG. 2(b) describes the flow of information in delivering narrowcast information to different requesting nodes in an exemplary consolidated information delivery framework, according to embodiments of the present invention.

FIGS. 2(a) and 2(b) describe embodiments of the broadcast and narrowcast information delivery modes. FIG. 2(a) illustrates that in a broadcast mode, content is delivered downstream to all the users served within the service range. As shown in FIG. 2(a), each node in the framework 100 serves a plurality of users. When broadcast content reaches a head end, the head end forwards the broadcast content to all of its nodes, each of which subsequently broadcasts the content to all of its connected users.

FIG. 2(b) describes the flow of information in delivering narrowcast information to requesting nodes in the exemplary consolidated information delivery framework 100, according to an embodiment of the present invention. In this mode, the CIDC 110 sends only what is requested to where the corresponding request is made. That is, the CIDC 110 operates only when a request is received and, in addition, only when the destination is known. However, the term "narrowcast" is not limited to only cases in which the information is requested. Information that is delivered to an individual, or a group of individuals such as a node or a head end is referred to as "narrowcast" content.

FIG. 2(b) illustrates both downstream information transmission and upstream information transmission. A dotted line represents an upstream information path from a user to the CIDC 110 and a solid line represents a downstream information path along which requested narrowcast information is delivered from the CIDC 110 to a user. For example, a user 1 210 (associated with the node 130-1) may send an upstream request for certain video content (e.g., video 1 request 210a) to the node 130-1, through which the request is forwarded to the head end 1 130 and subsequently the CIDC 110. Upon receiving the request, the CIDC 110 selects the desired video content and sends the requested video (i.e., video 1 210*b*) downstream to the head end 1 130, through which the requested video 1 210*b* is forwarded to the node 130-1 and subsequently to the user 210.

In a similar fashion, another user (e.g., user 2 220) associated with the same node 130-1 may request some video that may be different from the video 1 210*b*. In addition, a different user (e.g., user 3 230) connected to a different node (e.g., node 130-2) of the same head end (i.e., the head end 1 130) may make another request for different content (e.g., video 3 230*b*). Furthermore, a user (e.g., user 4 240) served by a different head end (e.g., the head end 2 140) may also make a request (e.g., video 4 request 240*a*) for yet different video content (e.g., video 4 240*b*). Each of such users sends a respective request to the CIDC 110 in an upstream direction.

When the CIDC 110 receives multiple requests, it may process those requests individually or in parallel. Narrowcast information is identified according to the requests. Consequently, the narrowcast information generated to respond to different requests usually have to be delivered to different destinations. For instance, the video 1 210*b* generated for the user 1 210 needs to reach the user 1 210 and the video for the user 2 220 needs to be delivered to the user 2 220, both through the node 130-1. In other situations, different pieces of narrowcast information may also need to reach different nodes or even different head ends. For example, the video 1 210*b* for the user 1 210 is to be delivered to the node 130-1 of the head end 1 130, the video 3 230*b* generated for the user 3 230 is to be delivered to a different node 130-2 of the same head end 130, and the video 4 240*b* for the user 4 240 needs to be delivered to the node 140-1 of a different head end (i.e., the head end 2 140).

The CIDC 110 determines how to deliver information according to, for example, two levels of consideration. At one level, the CIDC 110 distinguishes broadcast content from narrowcast content. At another level, the CIDC 110 distinguishes different destinations (e.g., nodes) to where different pieces of narrowcast content are to be sent. To distinguish content at both levels, dedicated carriers may be employed. Such dedicated carriers include, for instance, RF subcarriers and optical carriers.

Figure 3:
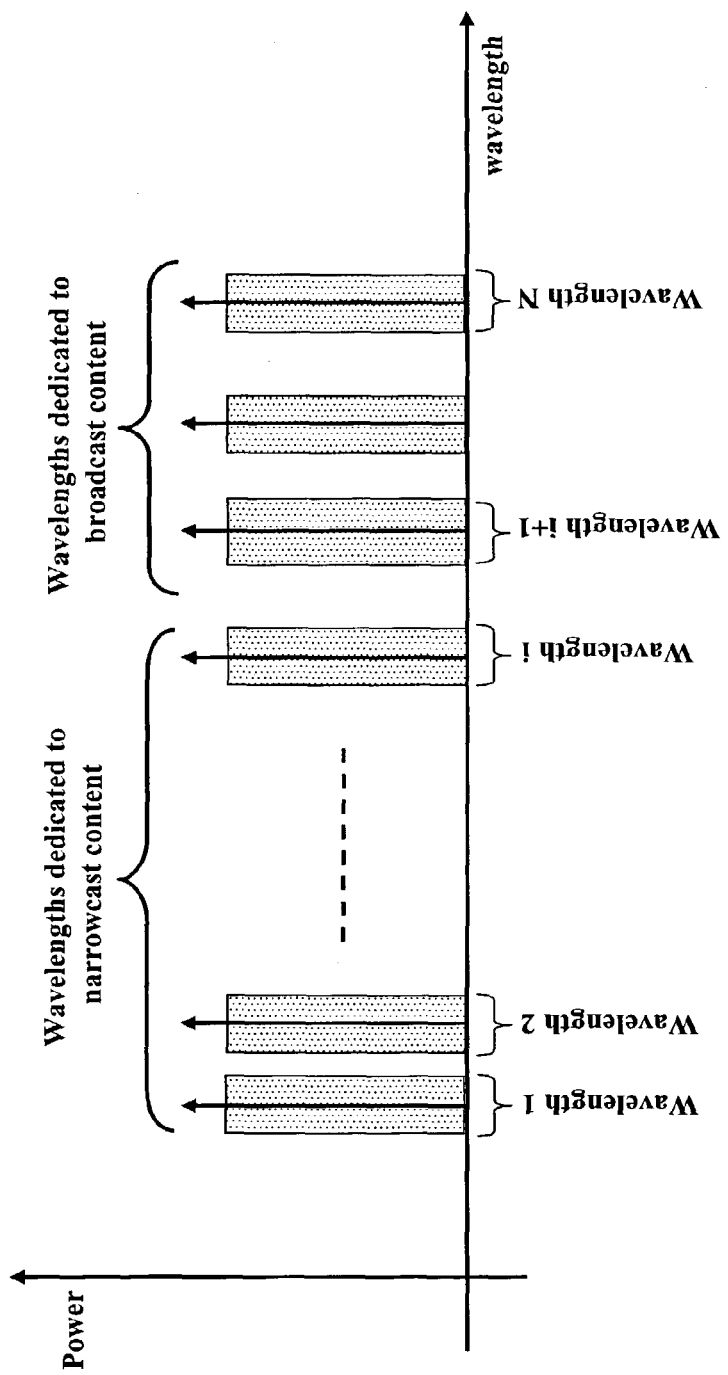
FIG. 3 illustrates an exemplary optical carrier allocation scheme with respect to broadcast and narrowcast information according to embodiments of the present invention.

FIG. 3 illustrates an exemplary optical carrier allocation scheme to distinguish broadcast and narrowcast information, according to an embodiment of the present invention. In this exemplary scheme, some optical carriers with certain wavelengths (e.g., wavelength i+1 to wavelength N) may be dedicated to broadcast information and some optical carriers within a different range of wavelengths (e.g., wavelength 1 to wavelength i) may be dedicated to narrowcast content. The optical channels dedicated to broadcast information may also have lower wavelengths. Furthermore, the wavelength channels dedicated to broadcast information may be interleaved with the wavelength channels dedicated to narrowcast information.

Figure 4:
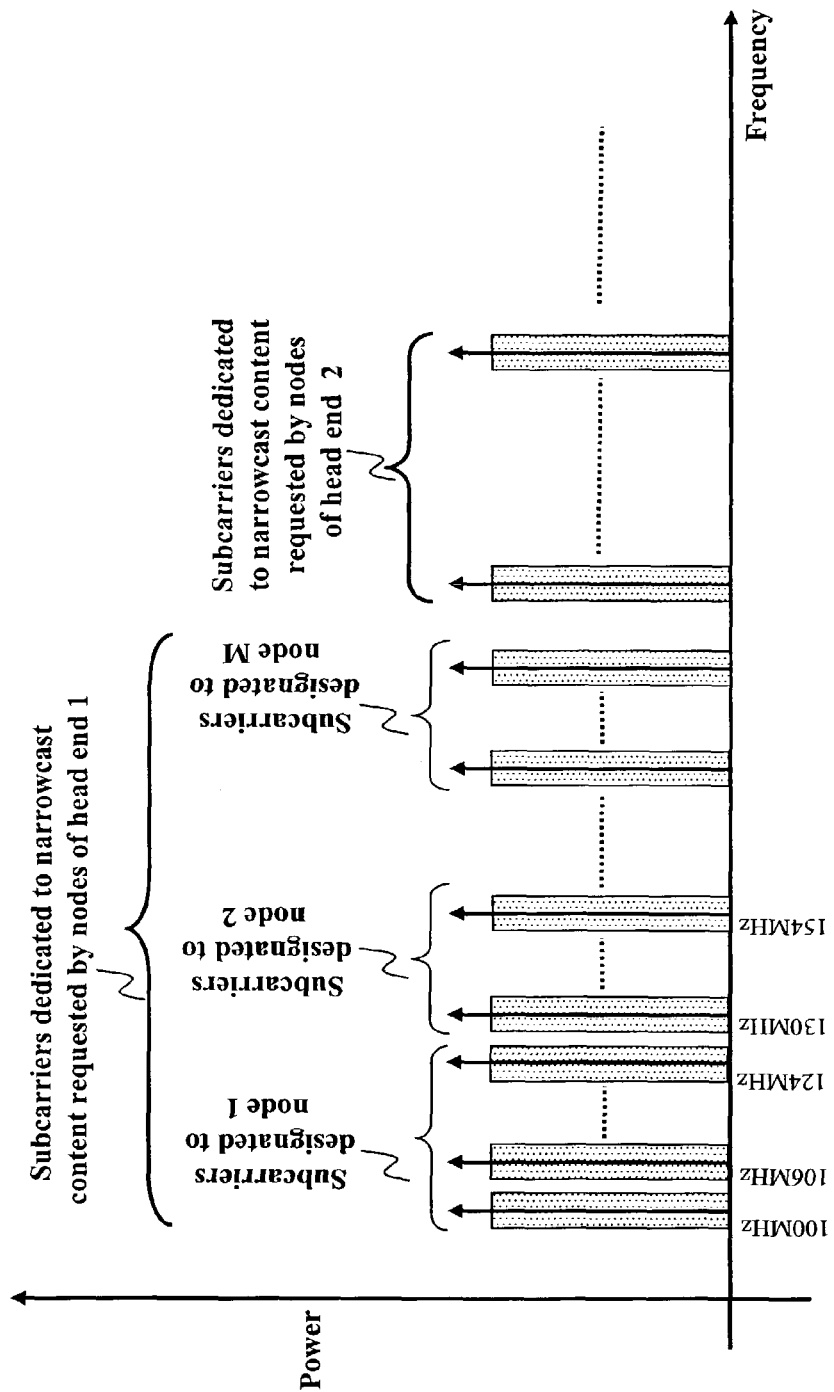
FIG. 4 illustrates an exemplary RF subcarrier allocation scheme with respect to different nodes for narrowcast information according to embodiments of the present invention.

FIG. 4 illustrates an exemplary RF subcarrier allocation scheme with respect to different nodes for narrowcast information, according to an embodiment of the present invention. In this exemplary scheme, different carriers may be allocated or dedicated to deliver narrowcast information to different nodes. In the exemplary scheme shown in FIG. 4, a group of live adjacent subcarriers are dedicated to a single node. For example, evenly spaced subcarriers at frequencies of 100 MHz, 106 MHz, . . . , 124 MHz are dedicated to the node 1 130-1 of the head end 1 130. Subcarriers at frequencies of 130 MHz, 136 MHz, . . . , 154 MHz are dedicated to the node 2 130-2 of the head end 1 130. When all the nodes in the head end 1 130 have been assigned dedicated subcarriers, the remaining bandwidth of an underlying optical carrier can be dedicated to the nodes of a different head end such as the nodes in the head end 2 140.

In the illustrated scheme, the subcarriers are evenly spaced. Alternatively, such dedicated subcarriers do not have to be evenly spaced. The bandwidth of each subcarrier may be determined according to different considerations. For example, the bandwidth of a subcarrier dedicated to a particular node may be related to the number of users the node is serving or the amount of information the node allows each of its users to demand.

The bandwidth of a dedicated subcarrier may be determined according to the type of information to be delivered using the subcarrier. If a node provides services relating to delivery of different types of information (e.g., video and mails), each subcarrier may be used to deliver one type of information. In this case, for instance, the bandwidth of a subcarrier dedicated to carry video data may be much higher than that of a subcarrier dedicated to carry email information. In addition, the subcarriers dedicated to a single node do not have to be adjacent. That is, adjacent subcarriers may be dedicated to different nodes of a same head end or even a different head end.

The subcarriers dedicated to a node to deliver narrowcast information do not have to be within the same frequency range as what the node accpets. For example, if a node accpets five subcarriers of narrowcast content within a frequency range from 500 MHz to 524 MHz with evenly spaced subcarriers separated by 6 MHz, the subcarriers dedicate to the node for delivering the narrowcast content may have a different range of frequencies such as from 100 MHz to 124 MHz. In this case, narrowcast content designated to this node may be organized at the CIDC 110 in five subcarrier channels from 100 MHz to 124 MHz. When the corresponding head end receives the narrowcast content, the dedicated subcarriers at 100 MHz, 106 MHZ, . . . , 124 MHz are translated to the underlying subcarriers accepted by the node at 500 MHz, 506 MHz, . . . , 524 MHz, respectively. In this manner, all the nodes may operate at the same frequency range without requiring the use of multiple wavelengths to deliver narrowcast content to different nodes. However, the invention is not limited to all of the nodes operating at the same frequency.

When RF subcarriers are combined with optical carriers in an allocation scheme, the same subcarriers, may be used in combination with different optical carriers. For instance, subcarriers at 130 MHz and 136 MHz encoded in an optical carrier of a certain wavelength may be dedicated to the node 1 130-1 of the head end 1 130 and the same subcarriers encoded on an optical carrier of a different wavelength may be dedicated to node 3 140-3 of the head end 2 140. All available subcarriers may be fully utilized with respect to each single optical carrier. Since an optical carrier usually has capacity to incorporate a large number of subcarriers, a single optical carrier may be used to carry narrowcast content designated to different nodes or even different head ends.

Figure 5:
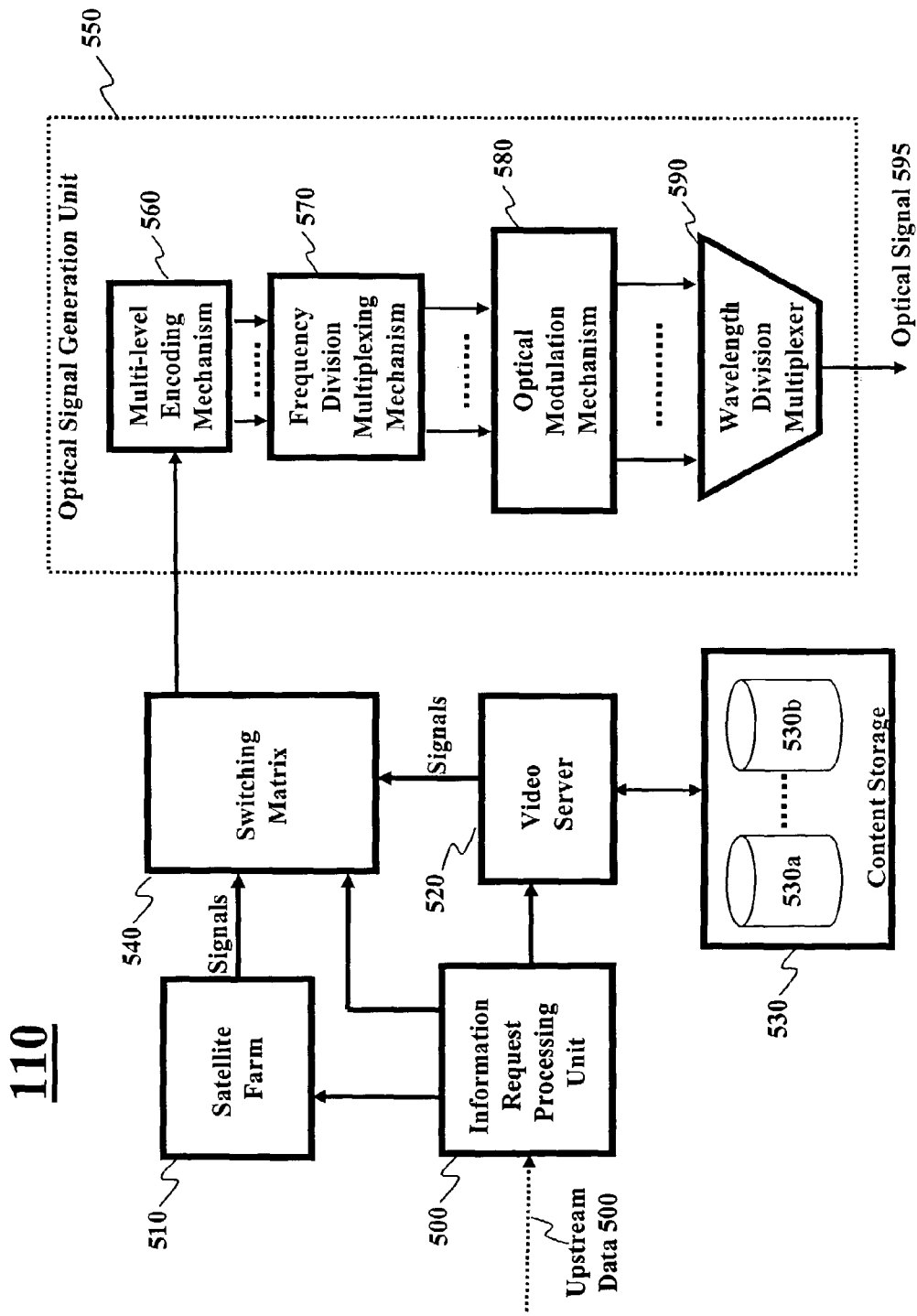
FIG. 5 depicts an exemplary block diagram of a central information distribution center according to embodiments of the present invention.

FIG. 5 depicts an exemplary block diagram of the CIDC 110, according to an embodiment of the present invention. The CIDC 110 may comprise, but is not limited to, an upstream request processing unit 500, a satellite farm 510, a video server 520, a content storage unit 530, a switching matrix 540, and an optical signal generation unit 550. The upstream request processing unit 500 may be provided to facilitate content delivery based on demand. As illustrated in FIG. 2(*b*), a user may send, upstream, a request for specific content to the CIDC 110 via its associated node and head end. Such a request is forwarded to the upstream request processing unit 500.

A request may be processed in such a manner so that the upstream request processing unit 500 can accordingly direct the control of content selection to an appropriate mechanism. For instance, if a user (e.g., user 1 210*a*) requests a specific video (e.g., video 1 210*b*) to be sent to a particular node (e.g., node 130-1), the upstream request processing unit 500, after processing the request, may instruct the video server 520 to select the requested content from the content storage unit 530 according to the request. In addition, the upstream request processing unit 500 may also forward information related to the destination of the requested content to the switching matrix 540 so that the requested narrowcast content, once selected, can be accordingly switched onto appropriate subcarriers dedicated to the node to which the requesting user is connected.

The satellite farm 510 may include a plurality of satellite dishes (not shown) that intercept signals from satellites. The video server 520 may comprise one or more physical servers that may facilitate different needs in content distribution. For instance, the video server 520 may facilitate video on demand, in which the video server 520 provides narrowcast content based on what a user or service subscriber requests. The video server 520 may also manage the content storage unit 530.

The content storage unit 530 is used to store content which may be, for example, digital video encoded in MPEG2 or MPEG4. The content storage unit 530 may include a plurality of storage devices 530*a*, . . . , 530*b* that may be managed by the video server 520. The content stored in the content storage unit 530 may be retrieved dynamically and may be broadcast or sent to various requesting nodes connected to the head ends 130, 140, . . . , 150 based on demand.

The content from either the satellite farm 510 or the video server 520 may correspond to multiple channels and each channel may comprise one or more data streams. For instance, the content intercepted from satellites by the satellite farm 510 may constitute TV broadcast of many channels and each channel may further comprise separate data streams such as video, audio, and transcriptions. The content stored in the content storage unit 530 may also be organized as such or in other fashions to facilitate efficient data storage and access.

The switching matrix 540 is used to route content to different dedicated channels. Dedicated channels may be used to enable a content distribution scheme in which different types of content may be delivered using different dedicated channels. For example, broadcast and narrowcast content may be delivered to head ends using different dedicated optical channels. One or more optical channels may be dedicated to deliver broadcast content only. Other optical channels may then be dedicated to narrowcast content. Alternatively, broadcast content may also be delivered through some dedicated subcarriers within each and every optical channel. In this case, narrowcast content is delivered using other subcarriers within each optical channel.

Narrowcast content may include, but is not limited to, content subscribed by a user through a node according to a particular service agreement, content scheduled to be delivered to a particular geographical region (with one or more head ends), or specific narrowcast content requested by a particular node (or subscribers served by the node). Narrowcast content may be delivered to a node using RF subcarriers and optical carriers that are dedicated to the node. In certain situations, there is another difference between broadcast and narrowcast content delivery. Some narrowcast content is delivered only when there is a demand, e.g., video on demand (VoD). Yet, broadcast content delivery is not related to demand. For instance, whenever broadcast news content is received from a satellite, it may be broadcasted to all nodes of all head ends.

With an appropriately designed carrier allocation scheme (e.g., as illustrated in FIGS. 4 and 5), the switching matrix 540 facilitates content delivery by dynamically routing certain content to pre-determined dedicated carriers, including both optical carriers and RF subcarriers. The design of a carrier allocation scheme may be application or service model dependent. For instance, it may be more efficient in some applications to separate optical channels for broadcast content from that for narrowcast channels. Furthermore, what constitutes broadcast content may also be application dependent.

According to the exemplary carrier allocation scheme as illustrated in FIGS. 4 and 5, narrowcast content is routed to dedicated subcarriers before it is up-converted to a dedicated optical carrier. It is also possible to dedicate only optical carrier to a node. In this case, narrowcast content may be routed directly onto its dedicated optical carrier. For example, video content that is on/off key base band can be transported directly to an optical modulator.

A complex content delivery scheme may be achieved through flexible use of dedicated carriers. For example, an optical channel may be dedicated to all (e.g., for delivering broadcast content) or some head ends (e.g., for delivering narrowcast content). Each head end may have one or more optical channel dedicated to it (e.g., one optical channel for broadcast content and one or more others for narrowcast content). The switching matrix 540 may be constructed in a manner that is consistent with a desired content delivery scheme. In other words, the switching matrix 540 programs a pre-determined content delivery scheme and dynamically routes content (signals) to appropriate channels according to the content delivery scheme.

The optical signal generation unit 550 takes signals routed from the switching matrix (representing the content to be distributed) and generates a single optical signal 595 as its output. The optical signal generation unit 550 may generate the optical signal 595 in more than one stage. For instance, input signals may be first modulated in a spectrally efficient manner. Such modulated signals may then be multiplexed onto dedicated RF subcarriers. To transmit such encoded content through an optical fiber (e.g., the optical fiber 120), the RF subcarriers may be further up-converted onto dedicated optical carriers, each at a different wavelength, and then multiplexed to yield a single optical wavelength division multiplexed signal 595.

The optical signal generation unit 550 comprises a multi-level encoding mechanism 560, a frequency division multiplexing (FDM) mechanism 570, an optical modulation mechanism 580, and a wavelength division multiplexer (WDM) 590. The multi-level encoding mechanism 560 may modulate signals corresponding to content from different data streams to yield modulated signals. Modulated signals corresponding to different data streams may be combined through the FDM mechanism 570 that multiplexes modulated signals of different data streams onto a RF subcarrier, yielding a single RF signal.

One or more different RF carriers of different frequencies may be used to carry modulated signals. When a single RF carrier is used, different groups of data streams may be multiplexed onto the same RF carrier of a fixed frequency, yielding different RF signals. When multiple RF carriers are used, different groups of data streams may be multiplexed onto multiple RF carriers of different frequencies. Different content is routed to different RF carriers. Such generated RF signals carry data streams based on different frequencies.

Each of the RF signals, either carried by RF carriers of the same frequency or different frequencies, can be up-converted onto the same or different optical carriers of different wavelengths. This is achieved through the optical modulation mechanism 580. Specifically, the optical modulation mechanism 580 may include a plurality of optical modulators, each of which modulates a single RF signal onto an optical carrier of a particular wavelength. Since an RF carrier may carry more than one data stream, these data streams may then be aggregated onto a single optical wavelength. As discussed above, content (e.g., on/off key base band video data) may be routed directly (without being modulated into an RF carrier) to an optical modulator corresponding to a particular wavelength to be encoded.

The optical modulation performed by the optical modulation mechanism 580 yields a plurality of optical signals, carrying multiple data streams. The multiple data streams can be further aggregated to generate a single optical signal. This is achieved through the wavelength division multiplexer (WDM) 590, which takes a plurality of optical channels, carrying the multiple data streams, and multiplexes the optical signals to generate a single wavelength division multiplexed optical signal 595 as the output of the CIDC 120.

Figure 6:
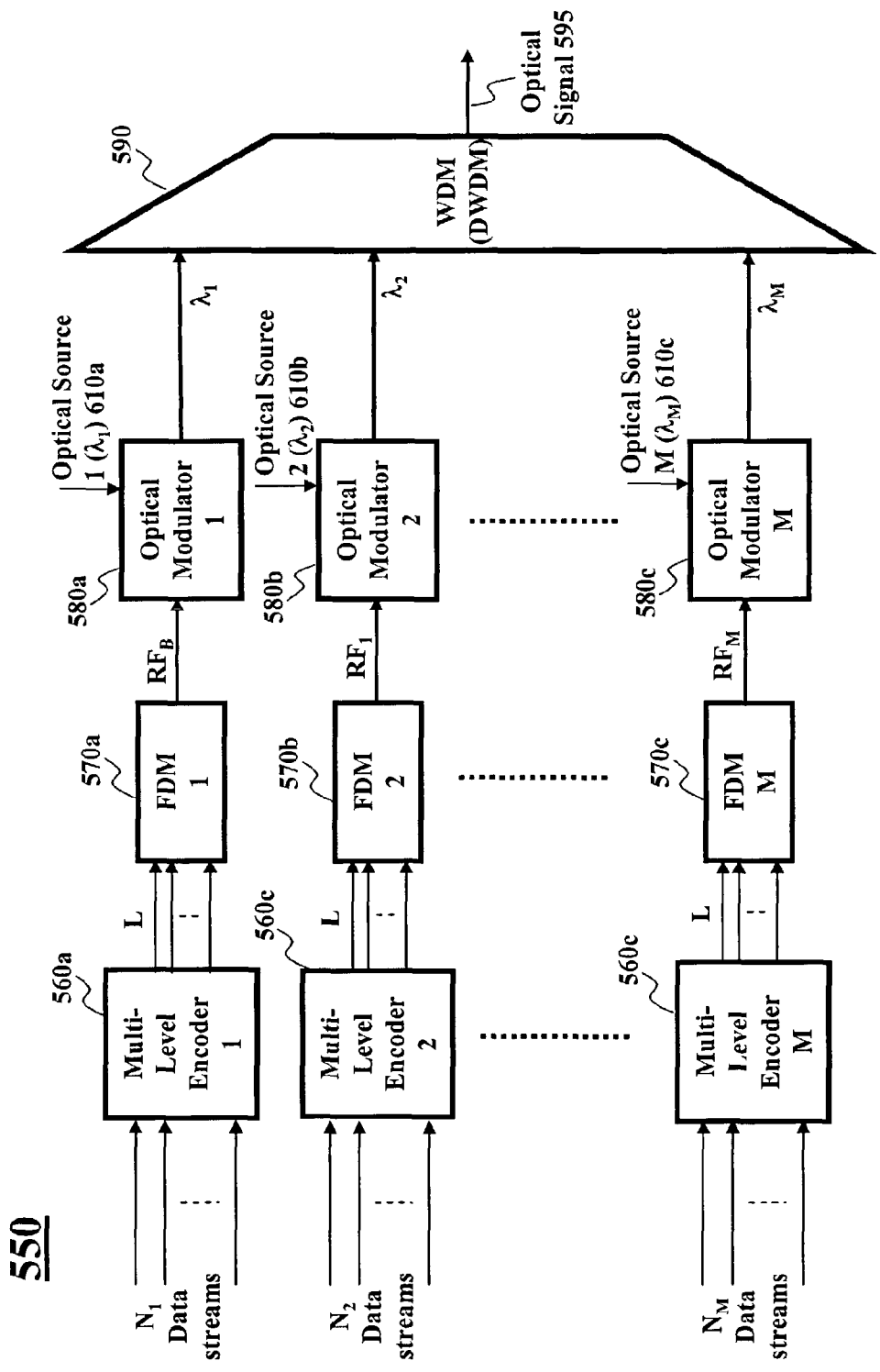
FIG. 6 schematically depicts an exemplary internal structure of an optical signal generation unit according to embodiments of the present invention.

FIG. 6 depicts an exemplary detailed internal structure of the optical signal generation unit 550, according to embodiments of the present invention. The multi-level encoding mechanism 560 may include M multi-level encoders (multi-level encoder 1 560*a*, multi-level encoder 2 560*b*, multi-level encoder m 560*c*). The FDM mechanism 570 may include M frequency division multiplexers (FDMs) (FDM 1 570*a*, FDM 2 570*b*, FDM m 570*c*). Correspondingly, the optical modulation mechanism 580 also includes M optical modulators (optical modulator 1 580*a*, optical modulator 2 580*b*, ..., optical modulator m 580*c*).

Each of the optical modulators takes an RF signal and encodes the RF signal onto an optical carrier provided by an optical source. An optical source 1 610*a* with wavelength $\lambda_1$ is used by the optical modulator 1 580*a* to convert an RF signal onto an optical carrier with wavelength $\lambda_1$. Similarly, an optical source 2 610*a* with wavelength $\lambda_2$ is used by the optical modulator 2 580*b* to convert an RF signal onto an optical carrier with wavelength $\lambda_2$, etc.

The content data comprising multiple data streams may be divided into M groups, each of which includes N data streams. The first group of $N_1$ data streams is processed by the multi-level encoder 1 560*a*, the FDM 1 570*a*, and the optical modulator 1 580*a*. The multi-level encoder 1 560*a* modulates the N data streams and generates L modulated signals. Here, L is not necessarily equal to $N_1$. That is, the multi-level encoder 1 560*a* may combine more than one data streams into a single modulated signal. The output of each of the pipelines produces an optical signal carried on a particular optical carrier at a certain wavelength. Similarly, the second group of $N_2$ data streams is processed by the multi-level encoder 2 560*b*, the FDM 2 570*b*, and the optical modulator 2 580*b* and the pipeline produces an optical signal carried by an optical carrier of wavelength $\lambda_2$.

If a particular optical carrier is dedicated to one or more head ends, any content that is intended for those head ends may be routed (by the switching matrix 540) to appropriate pipelines. For example, one of the pipelines (e.g., the first one) may produce an optical carrier of wavelength $\lambda_1$ that is dedicated to carry broadcast content (for all head ends). The remaining optical carriers with wavelengths $(\lambda_2, \ldots, \lambda_M)$ may be dedicated to narrowcast content based on demand. In this case, broadcast content is routed to the first pipeline and narrowcast content is routed to other pipelines according to the destination of the narrowcast content (the node and the head end for which the content is intended).

Other arrangements are also possible. As discussed earlier, broadcast content may also be routed to all pipelines so that broadcast content will be carried by every optical carrier to ensure that all head ends can receive the content. In addition, some content may be routed directly to appropriate optical modulator(s) (now shown in FIG. 5). Finally, different optical carriers generated by different pipelines are multiplexed by the WDM 590 to produce the optical signal 595.

Figure 7:
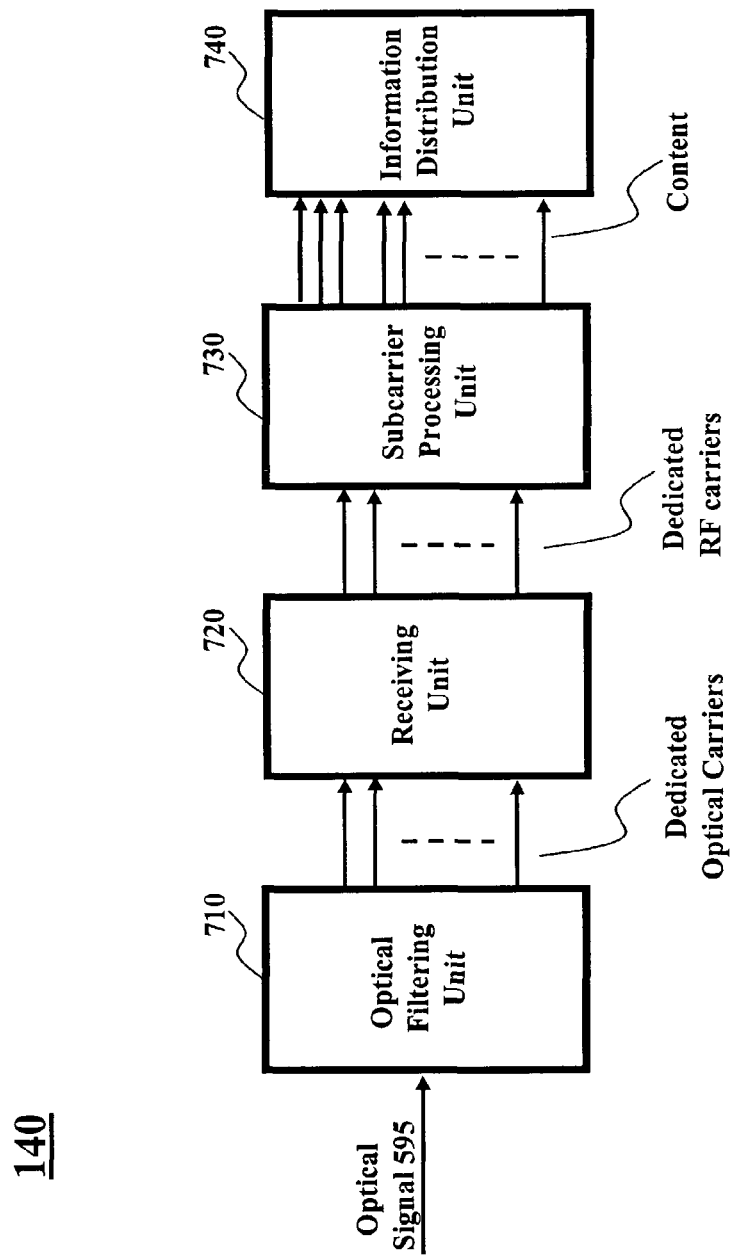
FIG. 7 schematically depicts an exemplary block diagram of a head end according to embodiments of the present invention.

FIG. 7 depicts an exemplary block diagram of a head end (e.g., the head end 140) according to an embodiment of the present invention. With the above-described consolidated content distribution framework 100, a head end is equipped to be capable of receiving content that is sent to the head end in an optical channel from the CIDC 110 via an optical fiber, wherein the content is carried by one or more dedicated optical carriers.

To receive content encoded in dedicated carriers, the head end 140 comprises, but is not limited to, an optical filtering unit 710, a receiving unit 720, an RF-based decoding unit 730, and a content distribution unit 740. The optical filtering unit 710 takes the optical signal 595 transported through the optical fiber 120 and filters the optical signal 595 to obtain one or more optical channel dedicated to the head end 140. The receiving unit 720 then down-converts each of the dedicated optical channels to its corresponding dedicated RF/microwave carriers carrying a plurality of RF signals. The RF-based decoding mechanism 730 decodes the RF signals to generate (or recover) the content data intended for the head end.

The content distribution unit 740 delivers content to appropriate nodes connected to the head end 140. This includes both distributing broadcast content and narrowcast content. While broadcast content is forwarded, without discretion, to all nodes associated with the head end 140, narrowcast content distribution is delivered to the nodes that have requested the content. As discussed earlier, within a single head end, narrowcast content for different nodes may be delivered using different dedicated carriers. Since the dedicated carriers for a node may be at different frequency ranges as what is accepted by the node, the dedicated carriers may be translated to the carriers acceptable by the node prior to be delivered.

Figure 8:
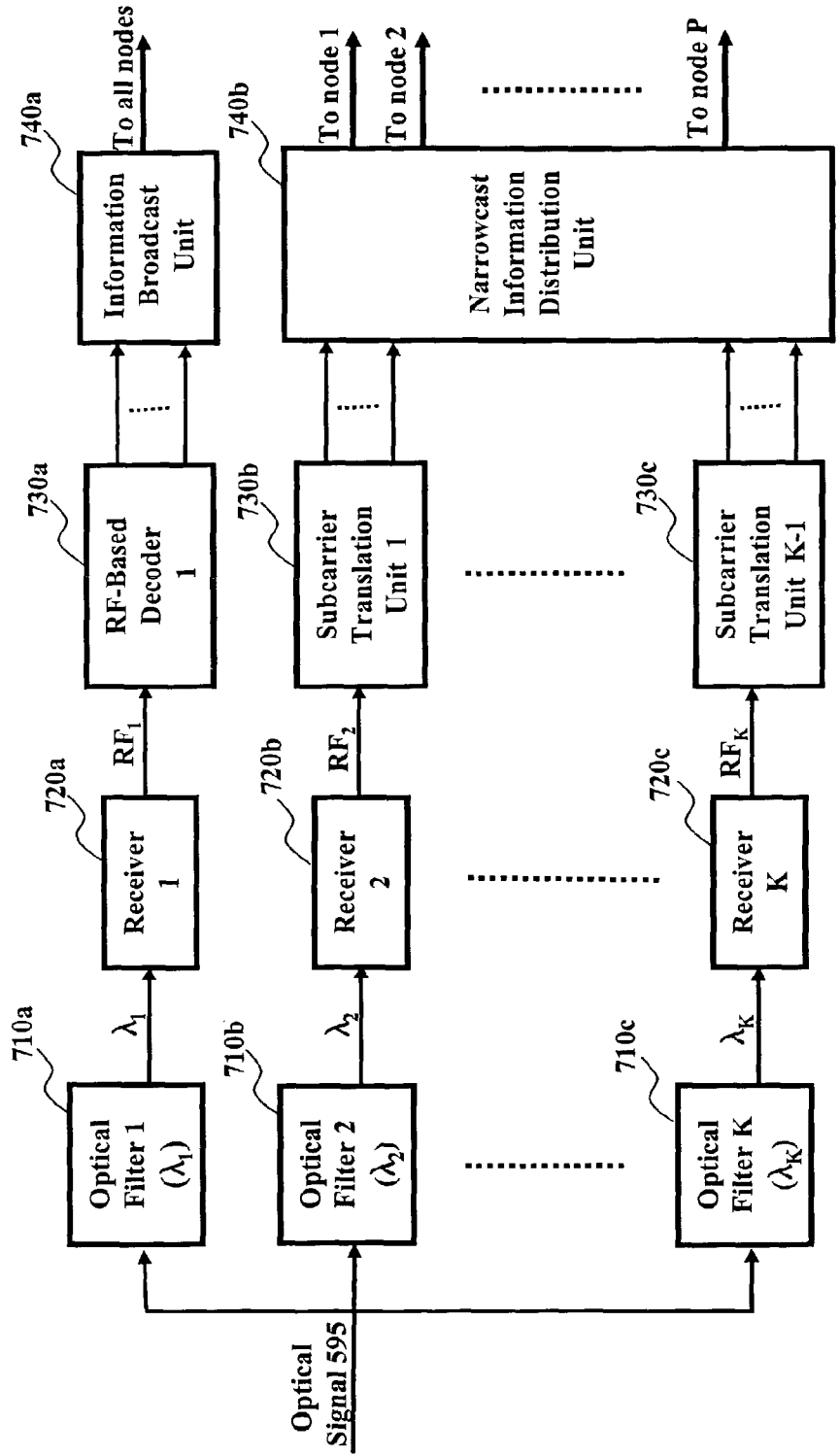
FIG. 8 is a schematic, exemplary detailed internal structure of a head end according to embodiments of the present invention.

FIG. 8 is an exemplary detailed internal structure of a head end, according to embodiments of the present invention. The optical filtering unit 710 comprises K optical filters (an optical filter 1 710*a*, an optical filter 2 710*b*, . . . , and an optical filter K 710*c*), each of which is tuned to a particular wavelength and is capable of filtering the optical signal so that only one optical channel whose wavelength matches the wavelength of the optical filter can go through the filter. Since only certain optical channels may be dedicated to a head end, the head end may comprise only the devices that are tuned to the dedicated optical channels (e.g., K dedicated optical channels).

The receiving unit 720 includes a plurality of receivers (a receiver 1 720*a*, a receiver 2 720*b*, . . . , a receiver K 720*c*), each of which takes a filtered optical channel with a particular wavelength and down-converts the optical channel to a corresponding RF signal with a particular frequency. For instance, the receiver 1 720*a* takes an optical channel with wavelength $\lambda_1$ (output of the optical filter 1 710*a*) and down-converts it to an RF signal with frequency $RF_1$.

The RF-based decoding unit 730 includes an RF-based decoder 730a and a plurality of subcarrier translation units (a subcarrier translation unit 1 730a, a subcarrier translation unit 2 730b, . . . , a subcarrier translation unit K–1 730c). As described earlier, to deliver broadcast content and narrowcast content to corresponding nodes of the head end 140, different delivery mechanisms may be employed. In FIG. 8, the RF-based decoder 730a is for handling broadcast content and the subcarrier translation units 730b, . . . , 730c are for handling narrowcast content.

In the exemplary embodiment illustrated in FIG. 8, the optical filter 1 710a, the receiver 1 720a, and the RF-based decoder 730a form a pipeline to decode broadcast content encoded in the optical carrier with wavelength dedicated to broadcast content. The optical filter 1 710a selects the optical carrier that is dedicated to broadcast content. The receiver 1 720a down-converts the broadcast optical carrier X to an RF carrier with frequency $RF_1$. The RF-based decoder 730a performs RF-based decoding to decode broadcast content by demodulating the RF signals carried on RF carriers to recover the broadcast content. The recovered broadcast content is sent to all nodes connected to the head end 140 by a content broadcast unit 740a. Alternatively, there may be more than one pipeline dedicated to broadcast content.

Remaining pipelines in the head end 140 handle narrowcast content encoded in different carriers. Each pipeline is tuned to a different optical carrier. For instance, the pipeline formed by the optical filter 2 710b, the receiver 2 720b, and the subcarrier translation unit 1 720b is tuned to the optical carrier with wavelength $\lambda_2$. The pipeline formed by the optical filter K 710c, the receiver K 720c, and the subcarrier translation unit K–1 730c is tuned to the optical carrier with wavelength $\lambda_K$. The number of pipelines needed for each head end may vary, depending on how many optical carriers are dedicated to the head end. For instance, if only two optical carriers (e.g., one for broadcast content and the other for narrowcast content) are dedicated to a head end, only two pipelines are needed (the first pipeline for broadcast content plus another pipeline tuned to the wavelength that matches with the dedicated optical carrier for narrowcast content).

In FIG. 8, it is shown, for example, that one of the first decoding pipelines (formed by the optical filter 1 710a, the receiver 1 720a, and the RF-based decoder 1 730a) may be tuned to the optical carrier with wavelength $\lambda_1$ dedicated to carry broadcast content. Other decoding pipelines tuned to wavelengths ($\lambda_2$, . . . , $\lambda_K$) are dedicated to non-broadcast content (e.g., content from a video server). Other schemes may also be implemented, as discussed earlier. For instance, broadcast content may be alternatively routed and carried by all optical carriers.

The subcarrier translation units (i.e., 730b, . . . , 730c) may produce subcarriers within the same frequency range. For instance, if all the nodes connected to the head end 140 accept five subcarriers for narrowcast content within the frequency range of 500 MHz to 524 MHz, each of the subcarrier translation units may translate the subcarriers dedicated to each individual node to the subcarriers that the node allows. For example, subcarriers ranging from 100 MHz to 124 MHZ dedicated to node 140-1 are correspondingly translated to 500 MHz to 524 MHz, respectively. Similarly, subcarriers ranging from 130 MHz to 154 MHz are also translated to 500 MHz to 524 MHz, respectively.

Each subcarrier translation unit may be responsible for translating subcarriers for multiple nodes and each translated group of five subcarriers may be marked to be sent to a particular node. Such output from a subcarrier translation unit is sent to a narrowcast content distribution unit 740b which is responsible for delivering narrowcast content to appropriate nodes.

Figure 9A:
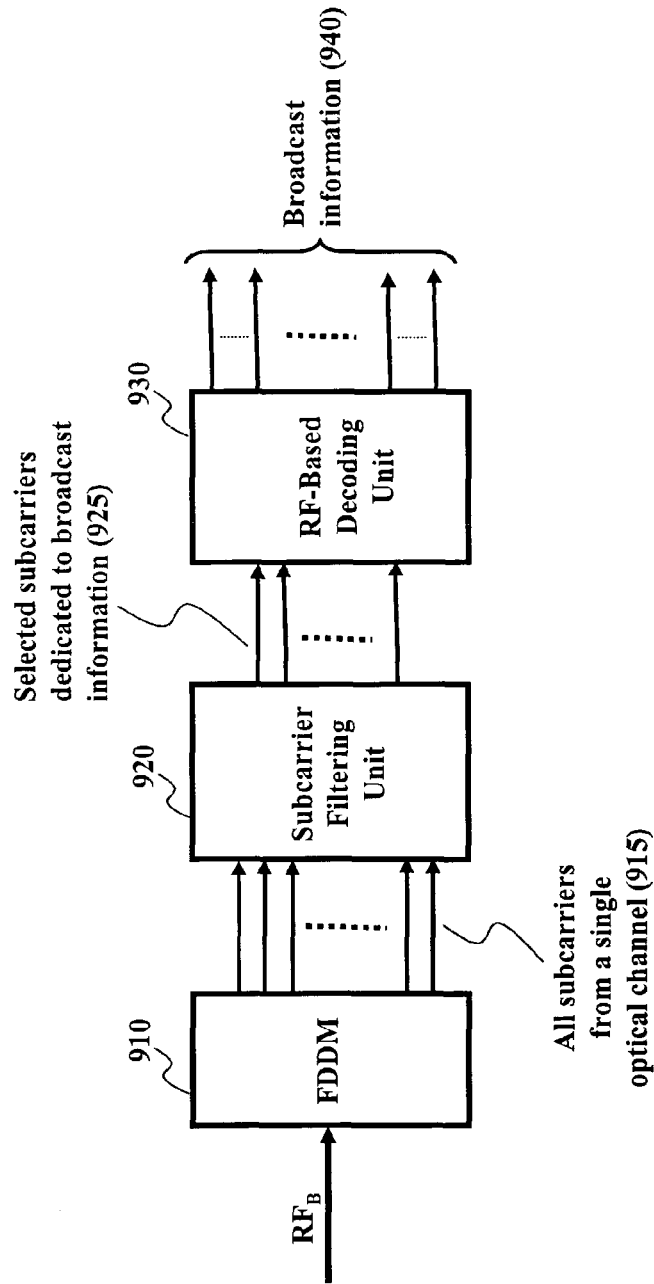
FIG. 9(a) schematically depicts an exemplary internal structure of an RF-based decoder for decoding broadcast information according to embodiments of the present invention.

FIG. 9(a) depicts an exemplary internal structure of the RF-based decoder 730a, according to an embodiment of the present invention. The RF-based decoder 730a comprises a frequency division demultiplexer (FDDM) 910, a subcarrier filtering unit 920, and an RF-based decoding unit 930. The FDDM 910 demultiplexes an RF signal (e.g., $RF_1$) into a plurality of RF signals on different subcarriers 915. When only a selected group of subcarriers are dedicated to broadcast content, the subcarrier filtering unit 920 filters such dedicated subcarriers 925. The RF-based decoding unit 930 then decodes the filtered RF signals to obtain the broadcast content 940.

Figure 9B:
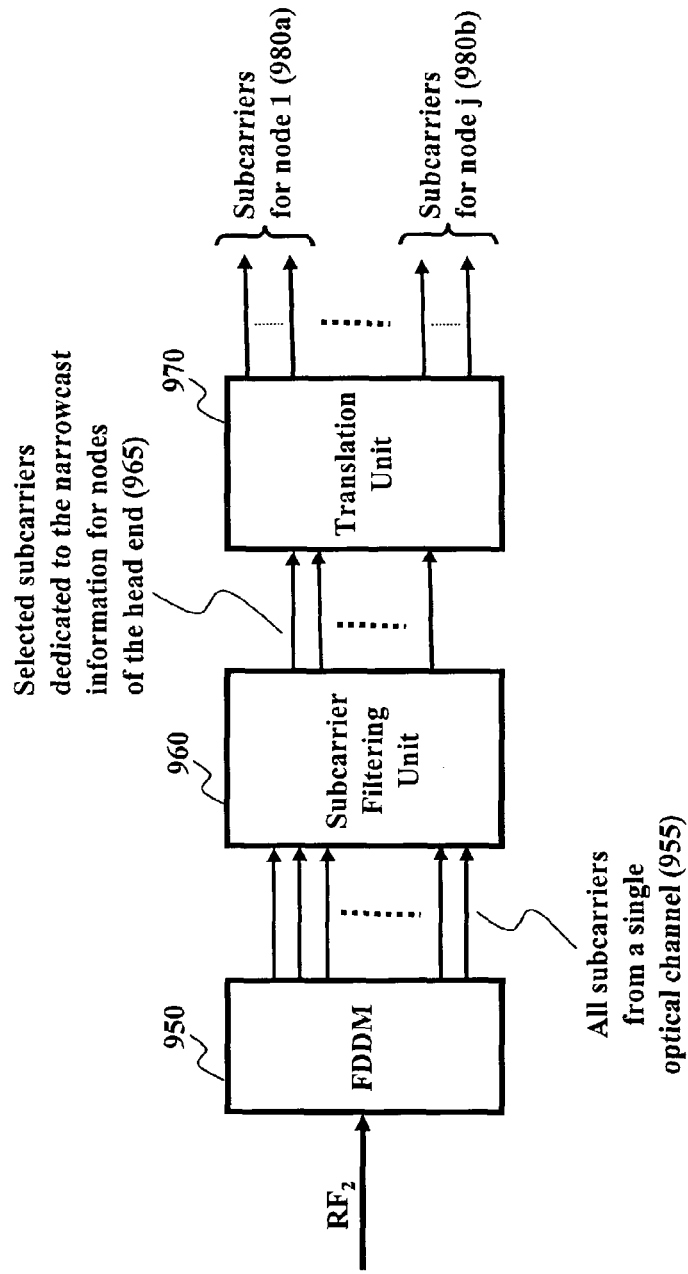
FIG. 9(b) schematically depicts an exemplary internal structure of a subcarrier translation unit according to embodiments of the present invention.

FIG. 9(b) depicts an exemplary internal structure of a subcarrier translation unit (e.g., the subcarrier translation unit 1 730b), according to an embodiment of the present invention. The subcarrier translation unit 1 730b comprises a frequency division demultiplexer (FDDM) 950, a subcarrier filtering unit 960, and a translation unit 970. The FDDM 950 demultiplexes an RF signal (e.g., $RF_2$) into a plurality of RF signals on different subcarriers 955. The demultiplexed subcarriers are then filtered so that only subcarriers dedicated to the head end 140 (965) are processed further. This may occur, for example, when a single optical carrier encodes subcarriers dedicated to nodes of different head ends.

The translation unit 970 then translates filtered subcarriers for each node to a group of corresponding subcarriers that the node accepts. The output of the translation unit 970 may comprise multiple groups of translated subcarriers, each of which corresponds to the subcarriers encoded with the narrowcast content to be delivered to the node.

Figure 10A:
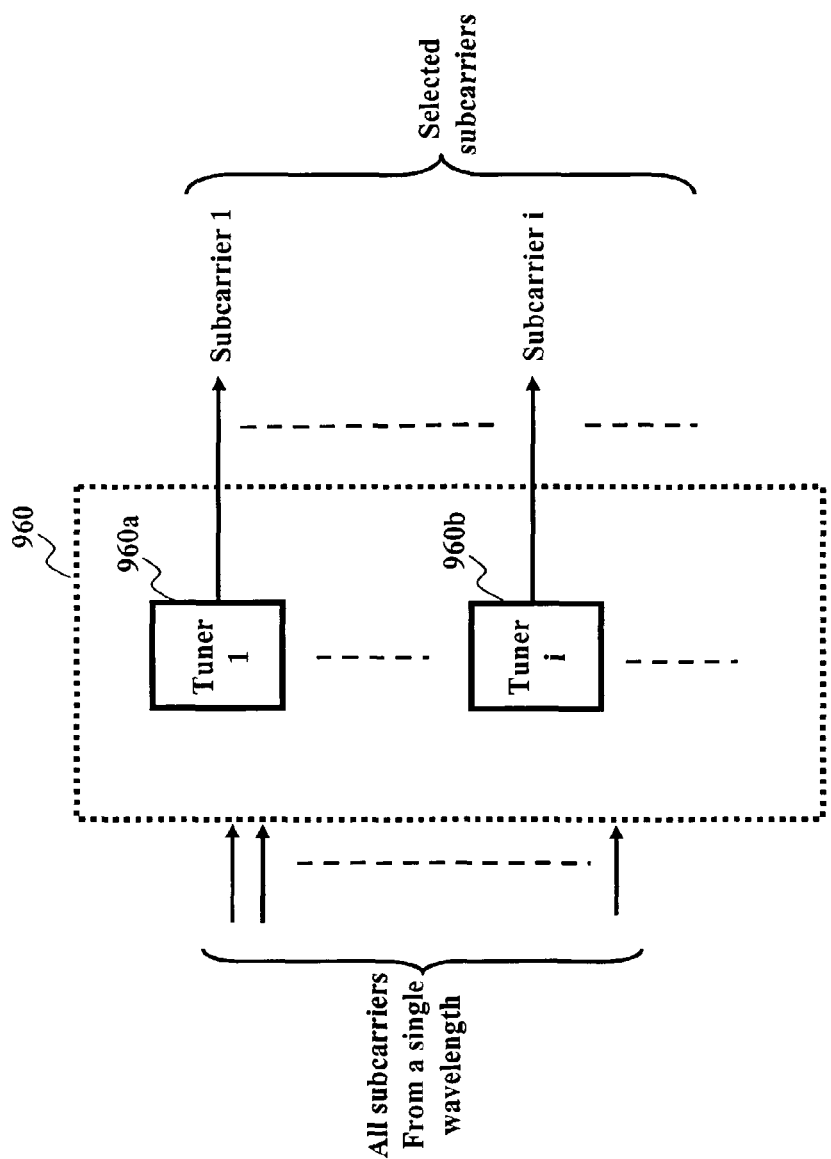
FIG. 10(a) schematically depicts an exemplary internal structure of a subcarrier filtering unit according to an embodiment of the present invention.
Figure 10B:
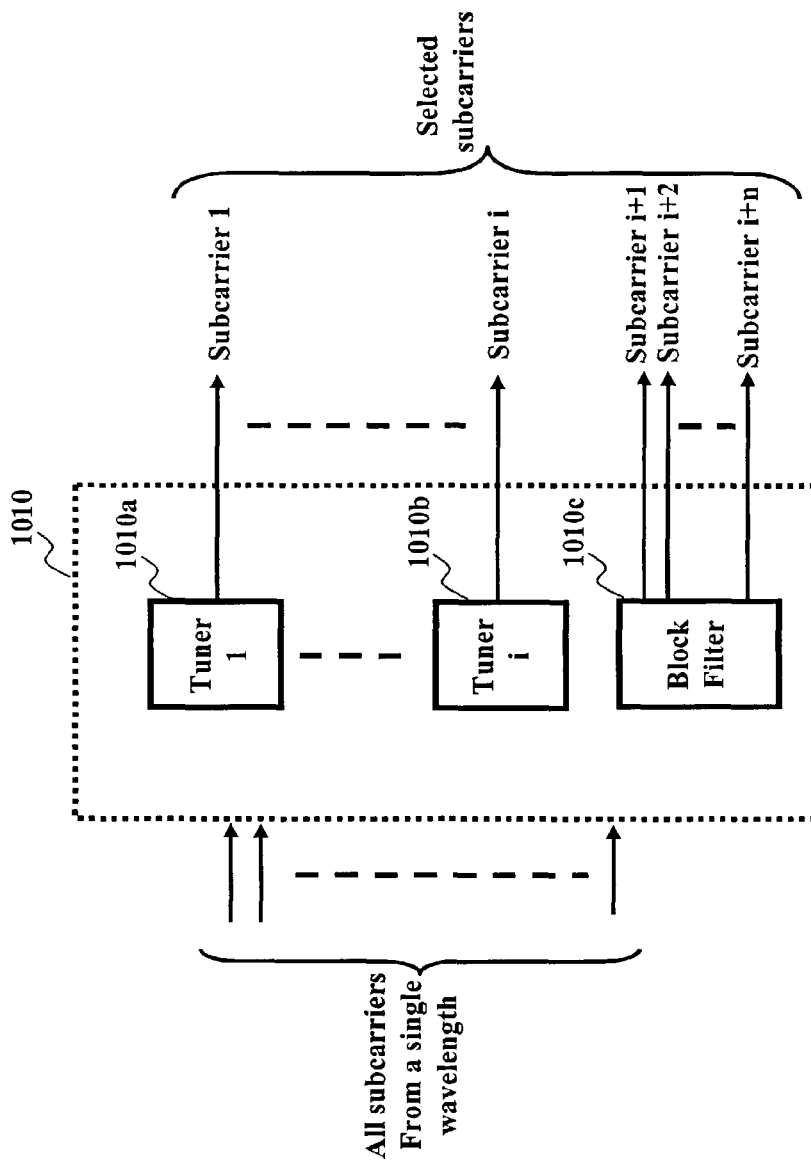
FIG. 10(b) schematically depicts another exemplary internal structure of a subcarrier filtering unit according to an embodiment of the present invention.

The subcarrier filtering required in both the RF-based decoder 730a and the subcarrier translation units (730b, . . . , 730c) may be achieved in different ways. FIGS. 10(a) and 10(b) illustrate two exemplary approaches. FIG. 10(a) depicts an exemplary internal structure of a subcarrier filtering unit (e.g., 920), according to an embodiment of the present invention. In this embodiment, there are a plurality of tuners (a tuner 1 960a, . . . , a tuner i 960b, . . . ), each of which may be tuned to one subcarrier of a particular frequency (e.g., the tuner 1 960a may be tuned to a subcarrier 1, . . . , the tuner i 960b may be tuned to a subcarrier i). Using this implementation, the subcarrier filtering unit 960 is capable of filtering out individual subcarriers that are separate (as opposed to adjacent). It may also be used to filter adjacent subcarriers.

FIG. 10(b) depicts another exemplary internal structure of a subcarrier filtering unit (e.g., 1010), according to an embodiment of the present invention. In this embodiment, the subcarrier filtering unit 1010 comprises both tuners (i.e., the tuner 1 1010a, . . . , the tuner i 1010b, . . . ) and one or more block filter (e.g., a block filter 1010c). A block filter is capable of filter out a group of adjacent subcarriers. For example, if there are five adjacent subcarriers within frequency range of 100 MHz and 124 MHz, with each subcarrier having a bandwidth of 6 MHz. In this case, a block filter designed to filter this particular range may be employed to simultaneously filter out these five subcarriers. Depending on a specific subcarrier allocation scheme, there may be other alternative implementations for a subcarrier filtering unit.

Figure 11A:
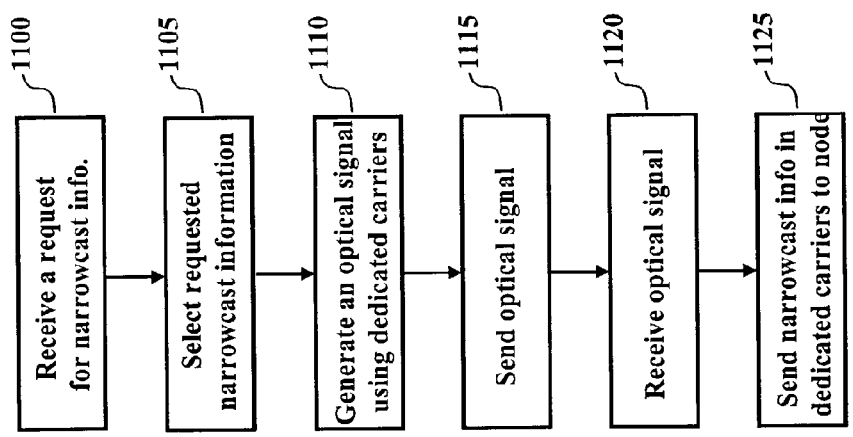
FIG. 11(a) is a flowchart of an exemplary process, in which requested narrowcast information is sent to a node using dedicated earners, according to embodiments of the present invention.

FIG. 11(a) is a flowchart of an exemplary process, in which requested narrowcast information is sent to a node using dedicated carriers, according to embodiments of the present invention. A request for content (or narrowcast content) is first received by the CIDC 110 at act 1100. The request is issued from a user associated with a node of a head end in the framework 100. According to the request, the CIDC 110 selects, at act 1105, the requested content. Both the selected narrowcast content and broadcast content (if any) is encoded using dedicated carriers. A wavelength division multiplexed optical signal is then generated at act 1110. Details related to how to generate the optical signal is described with reference to FIG. 11(*b*).

The encoded optical signal is sent, at act 1115, along the optical fiber 120 to one or more head end(s). When a head end receives the optical signal, at act 1120, the head end sends the narrowcast information encoded in dedicated carriers to the node from where the request is received. Details related to how a head end distributes narrowcast content to an appropriate node is described with reference to FIG. 11(*c*).

Figure 11B:
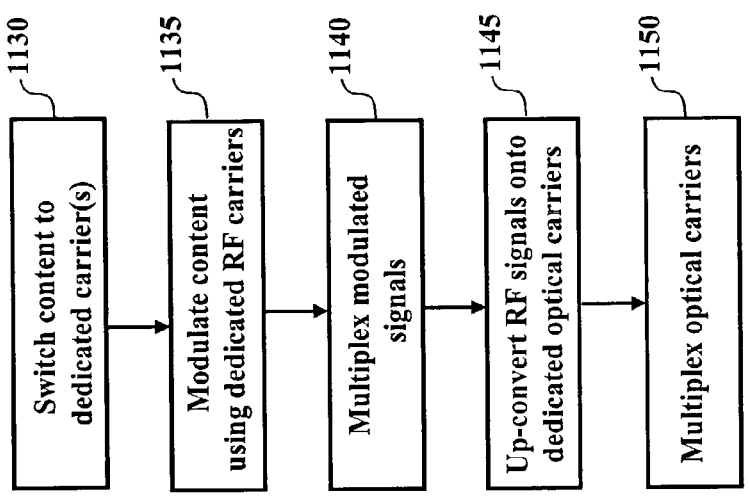
FIG. 11(b) is a flowchart of an exemplary process, in which an optical signal encoded with narrowcast information using dedicated carriers is generated, according to embodiments of the present invention.
Figure 11C:
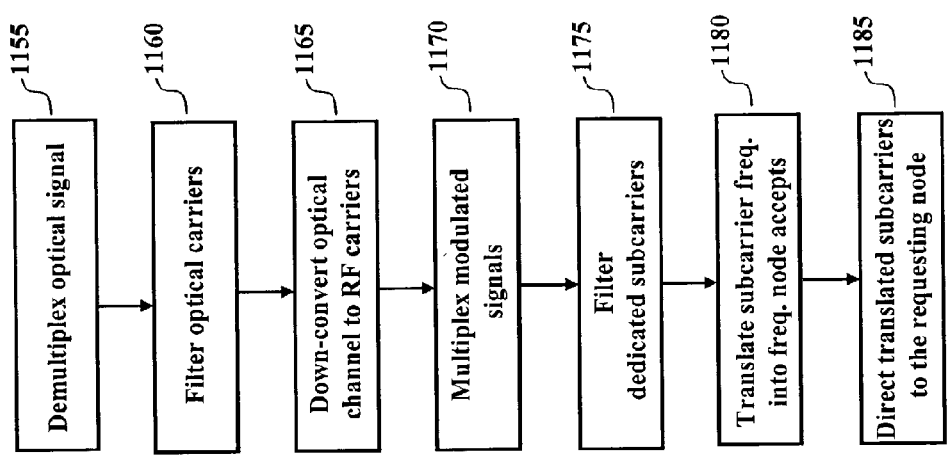
FIG. 11(c) is a flowchart of an exemplary process, in which narrowcast information encoded in dedicated carriers is sent to a requesting node, according to embodiments of the present invention.

FIG. 11(*b*) is a flowchart of an exemplary process, in which an optical signal encoded with narrowcast information using dedicated carriers is generated, according to embodiments of the present invention. Content, including both narrowcast content selected according to a request and broadcast content, if any, is first routed (by the switching matrix 540), at act 1130, to dedicated carriers according to a pre-determined carrier allocation scheme. The content is then modulated onto dedicated carriers at act 1135. Such modulated signals may then be multiplexed at act 1140. To optically transport the content, each multiplexed RF signal is up-converted, at act 1145, onto a dedicated optical carrier. To further aggregate the content, a plurality of optical signals may then be multiplexed, at act 1150, to generate a wavelength division multiplexed optical signal.

FIG. 11(*c*) is a flowchart of an exemplary process, in which a head end sends narrowcast content encoded in dedicated carriers to a requesting node, according to embodiments of the present invention. Upon receiving an optical signal, a head end first demultiplexes, at act 1155, the optical signal. Optical channels that are dedicated to the head end are filtered out at act 1160. Dedicated optical channels may include both the channels dedicated to broadcast content and narrowcast content for the nodes of the head end.

Each of the dedicated optical channels is down-converted, at act 1165, to a corresponding RF signal. Tithe RF signal encodes a plurality of RF signals on different RF subcarriers, the RE signal is demultiplexed, at act 1170, to produce the RF subcarriers which are further filtered, at act 1175, to select subcarriers dedicated to the relevant nodes. To forward the narrowcast content to the requesting nodes, the dedicated subcarriers are translated, at act 1180, to the target subcarriers (the ones that the requesting nodes accept). The narrowcast content encoded in such translated subcarriers are then directed, at act 1185, to the nodes that request the content.

Figure 12:
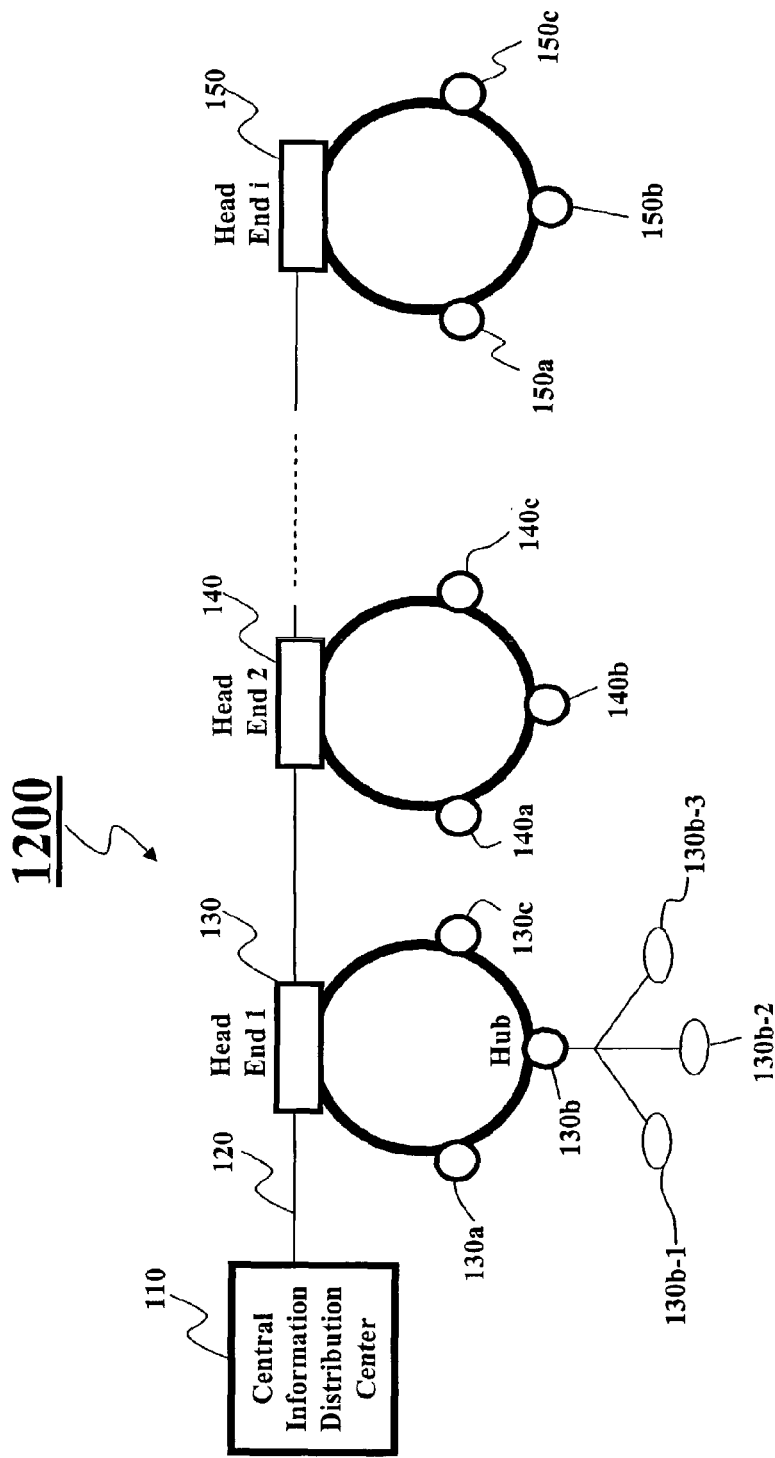
FIG. 12 schematically depicts an exemplary consolidated information delivery framework with hubs between a head end and nodes, according to a second embodiment of the present invention.

The above described schemes for narrowcast content delivery may also be applied to different consolidated information distribution frameworks. FIG. 12 depicts a different exemplary consolidated information delivery framework 1200 where hubs reside between a head end and nodes. For example, the head end 1 130 has hubs 130*a*, 130*b*, . . . , 130*c* and each hub may connect to a plurality of nodes; the head end 2 140 has hubs 140*a*, 140*b*, . . . , 140*c*, . . . ; the head end i 150 has hubs 150*a*, 150*b*, . . . , 150*c*. The narrowcast content delivery schemes may be enforced at both a head end, as described above, and at each hub to which it is associated. For instance, a head end (e.g., the head end 1 130) may forward the hub 130*b* the narrowcast content requested by the nodes associated with the hub 130*b* (e.g., nodes 130*b*-1, 130*b*-2, and node 130*b*-3) and the hub 130*b* then further direct different pieces of the received narrowcast content to individual nodes.

Figure 13:
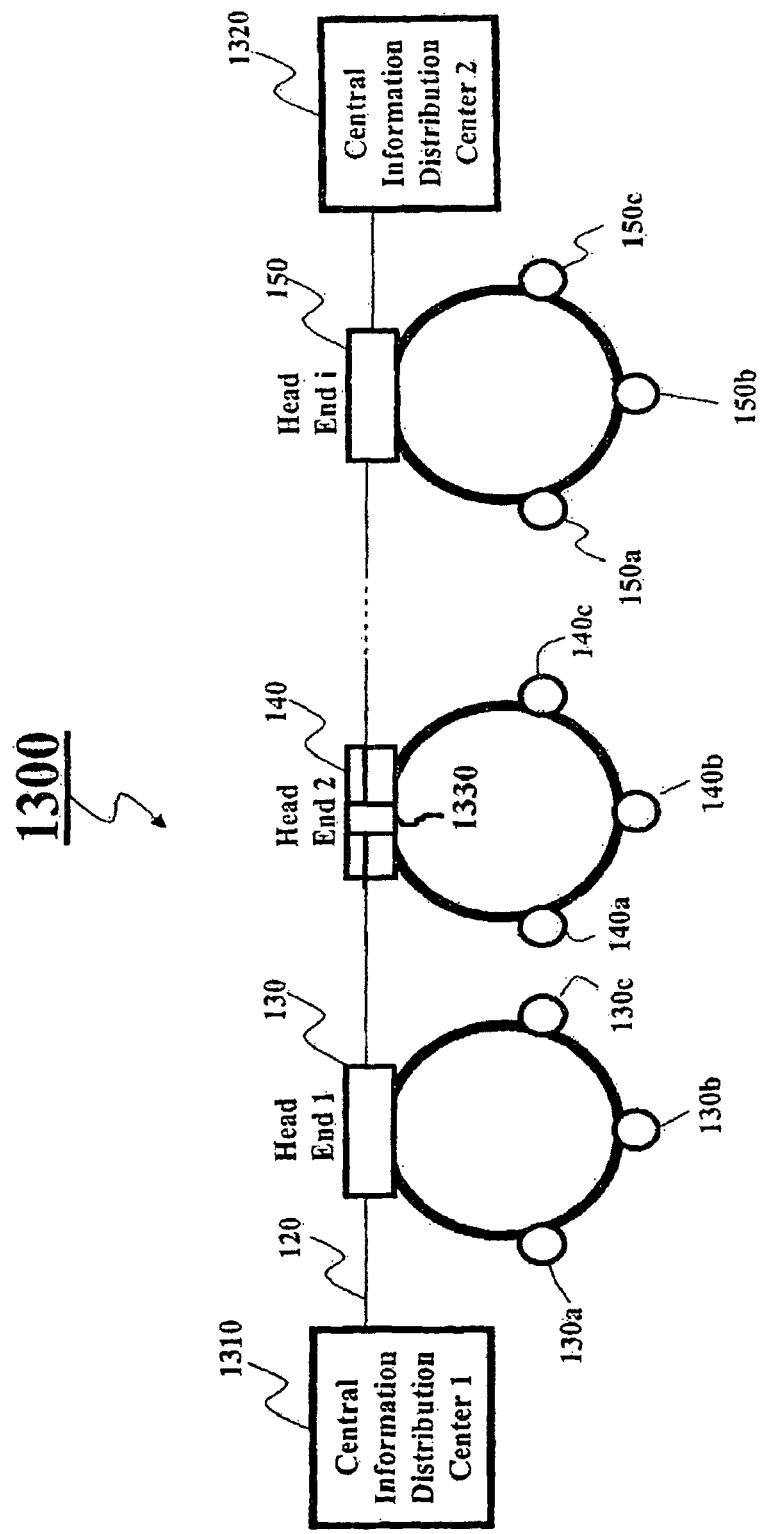
FIG. 13 schematically depicts an alternative exemplary consolidated information delivery framework with fault tolerance, in which narrowcast information is transported to head ends using dedicated carriers, according to embodiments of the present invention.

FIG. 13 depicts another exemplary consolidated information delivery framework 1300 with fault tolerance, in which narrowcast information is distributed according to the present invention. To provide fault tolerance, the framework 1300 includes two central information distribution centers, a CIDC 1 1310 and a CIDC 2 1320. The two CIDCs connect to the linearly arranged head ends (130, 140, . . . , 150) from opposite ends and each may send identical information to the head ends from reversed directions. For example, the CIDC 1310 sends out a first optical signal encoded with content, which may include both broadcast and narrowcast content, via the optical fiber 120 in a direction from the head end 1 130, to the head end 2 140, . . . , and to the head end i 150. At the same time, the CIDC 2 1320 sends a second optical signal encoded with the same content via the optical fiber 120 in a direction from the head end i 150, . . . , the head end 2 140, to the head end 1 130.

The CIDC 2 1320 may possess the same capability as the CIDC 1 1310. It may synchronize with the CIDC 1 1310, distributing the same content to the head ends 130, 140, . . . , 150 at the same time. However, the CIDC 2 1320 may acquire, store, and manipulate content independently. For example, the CIDC 2 1320 may have its own satellite dishes, its own storage systems, its own video servers, as well as its own content encoding mechanism. In addition, the CIDC 2 1320 may generate an optical signal based on its own version of the content data (e.g., same content as what the CIDC 1 1310 has) and send its optical signal to the head ends.

The framework 1300 provides fault tolerance through the two CIDCs. With both the CIDC 1 1310 and the CIDC 2 1320 synchronously distributing the same content data to the head ends, when one of the CIDCs fails to function, the head ends may still receive the encoded content data from the other CIDC. This requires that each of the head ends have the capability of receiving content data from both CIDCs and at a certain time determine which optical signal to intercept.

The above described narrowcast content distribution schemes may also be applied in the framework 1300. While the narrowcast content selection, switching, and encoding may be performed in the two CDICs in a similar fashion as described above, each head end in the framework 1300 may be required to add additional capabilities. For instance, in order for both CIDCs to provide the same narrowcast content, each head end may forward a content request (received from a user connected to one of its nodes) to both CIDCs. In this fashion, the two CIDCs can synchronously prepare the content requested and send to the head end using the same dedicated carrier(s).

To be able to receive content from either of the CIDCs, each head end may also deploy an additional optical signal switch in front of the optical filtering unit 710 (see FIG. 7) to select either the CIDC 1 1310 or the CIDC 2 1320 as the source of information. Such an optical switch may function dynamically according to the operational status of the two CIDCs. For instance, when the CIDC 1 1310 becomes non-operational, the optical signal switch in each head end may automatically switch the source of signal to the CIDC 2 1320 and vice versa.

Figure 14:
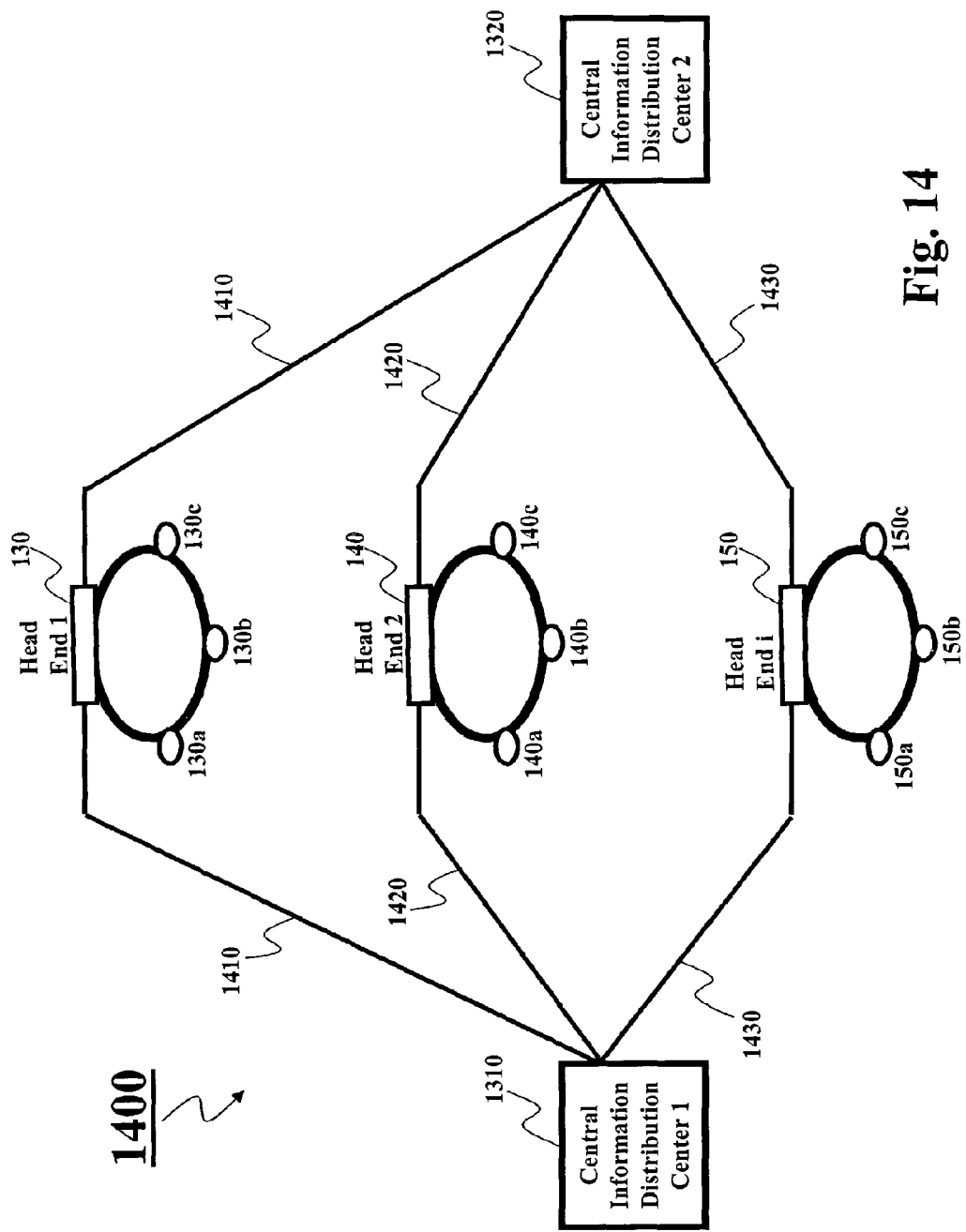
FIG. 14 schematically depicts another exemplary consolidated information delivery framework structured in a fault tolerant star configuration, in which narrowcast information is transported to head ends using dedicated carriers, according to embodiments of the present invention.

FIG. 14 depicts another alternative exemplary consolidated information delivery framework 1400 structured in a fault tolerant star configuration, in which narrowcast information is distributed according to the present invention. Similar to the framework 1300, two CIDCs (i.e., the CIDC 1 1310 and the CIDC 2 1320) are deployed to provide fault tolerance in the framework 1400. However, the head ends 130, 140, . . . , 150 are arranged, with respect to both the CIDC 1 1310 and the CIDC 2 1320, in a star configuration. That is, every head end is directly connected to both the CIDC 1 1310 and the CIDC 2 1320 via an optical fiber: the head end 1 130 through an optical fiber 1410, the head end 2 140 through an optical fiber 1420, . . . , the head end i 150 through an optical fiber 1430.

With this configuration, an optical signal encoded with content, which may include both broadcast and narrowcast content, from the CIDC 1 1310 is simultaneously sent to all the head ends through the optical fibers 1410, 1420, 1430. Similarly, the CIDC 2 1320 may operate synchronously with the CIDC 1 1310 in distributing broadcast and narrowcast content. Both CIDCs may distribute broadcast and narrowcast content using the same dedicated carriers according to the same pre-determined channel allocation scheme. The difference is that each CIDC sends encoded content in an opposite direction through the corresponding optical fibers.

In the framework 1400, each head end, as in the framework 1300, may be required to be equipped to possess additional capabilities in order to interact with both CIDCs. For instance, each head end may need to forward a request for content to both CIDCs in order for the CIDCs to act synchronously in distributing the content requested. In addition, each head end may also need to deploy an optical signal switch so that the head end is able to select a source from which content is to be received.

Figure 15:
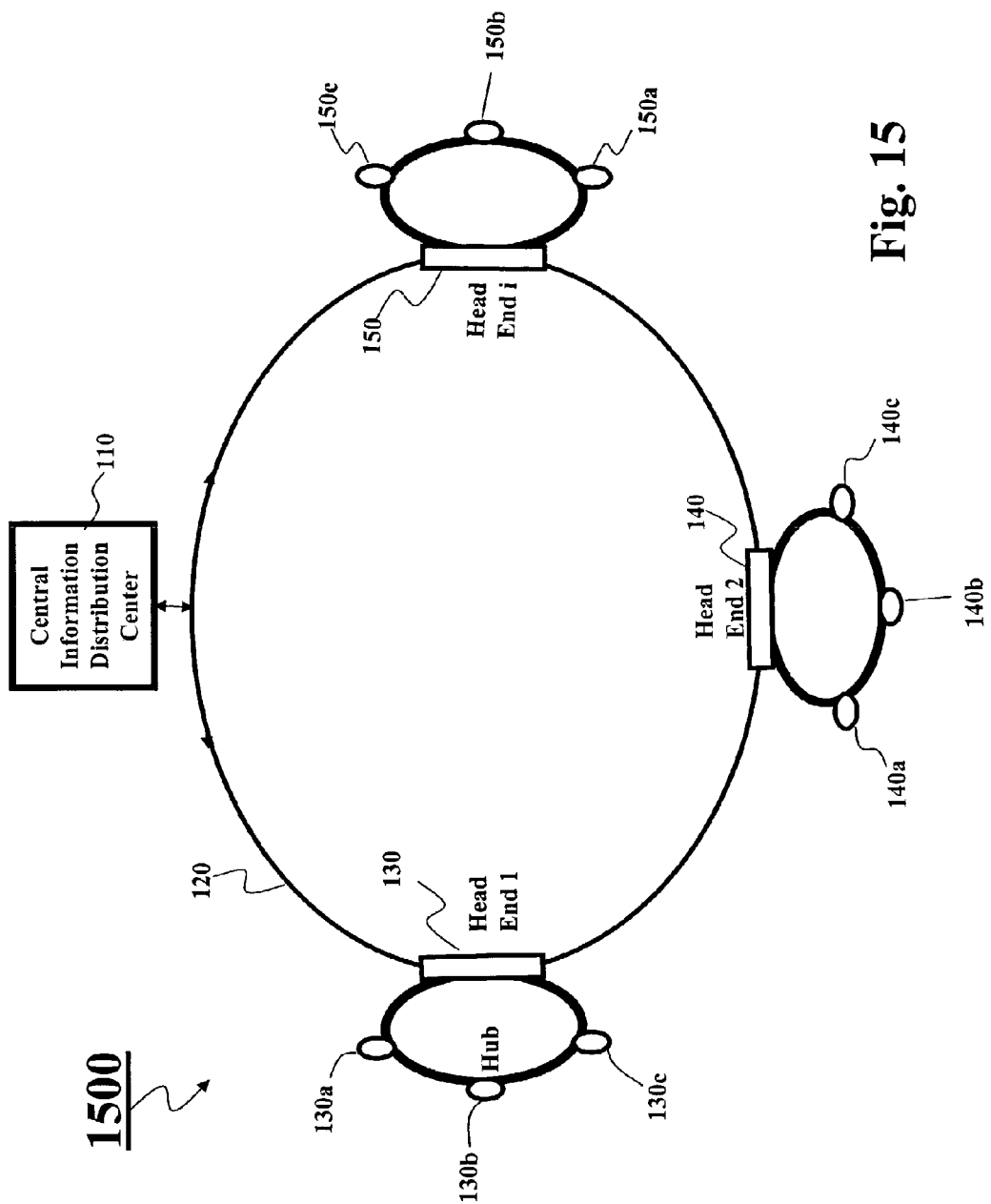
FIG. 15 schematically depicts yet another exemplary consolidated information delivery framework structured in a ring configuration, in which narrowcast information is transported to head ends using dedicated carriers, according to embodiments of the present invention.

FIG. 15 depicts yet another exemplary consolidated information delivery framework 1500 structured in a ring configuration. In the framework 1500, the head ends 130, 140, 150 are arranged, with respect to the CIDC 110, in a circular fashion. Encoding content, including both broadcast and narrowcast content, using dedicated carriers in an optical signal according to a pre-determined channel allocation scheme, the CIDC HO sends the optical signal to the head ends via the optical fiber 120 in both a clockwise direction and a counter clock direction. Alternatively, the framework 1500 may also include a second CIDC (not shown) to provide fault tolerance.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. An information distribution system, comprising:
a head end;
a particular node from among a plurality of nodes in communication with the head end; and
a central information distribution center in communication with the head end, the central information distribution being upstream of the head end;
wherein the head end is operable to receive a signal from the central information distribution center, and is further operable to distribute narrowcast information encoded in the signal using information channels assigned carrying narrowcast signals from the head end to the particular node, the assignment of the information channels to carry narrowcast signals occurring prior to receiving a request for narrowcast content from the particular node.

2. The information distribution system of claim 1, wherein the node is operable to relay a request for narrowcast information;
the head end is further operable to forward the request from the node to the central information distribution center; and
the central information distribution center is further operable to process the request forwarded from the head end, select the requested narrowcast information, and send the requested narrowcast information using a narrowcast information channel assigned to the requesting node.

3. The information distribution system of claim 1, further comprising a second head end, wherein the first mentioned head end, the second head end, and the central information distribution center are arranged in a linear configuration, in which an optical signal carrying the narrowcast information is transported from the central information distribution center to the first mentioned head end and then to the second head end.

4. The information distribution system of claim 3, further comprising a second central information distribution center connecting to the second head end, wherein a second optical signal encoded with the narrowcast information is transported from the second central information distribution center in a direction from the second head end to the first mentioned head end.

5. The information distribution system of claim 1, further comprising a second head end, wherein the first mentioned head end, the second head end, and the central information distribution center are arranged in a star configuration, in which the optical signal from the central information distribution center is transported via at least one optical fiber directly to the first mentioned head end and the second head end.

6. The information distribution system of claim 5, further comprising a second central information distribution center connecting to the first mentioned head end and the second head end in the star configuration via at least one optical fiber, wherein a second optical signal encoded with the narrowcast information from the second central information distribution center is transported directly to the first mentioned head end and the second head end.

7. The information distribution system of claim 1, further comprising a second head end, wherein the first mentioned head end, the second head end, and the central information distribution center is arranged in a ring configuration, in which the optical signal carrying the narrowcast information from the central information distribution center is transported to the first mentioned head end and the second head end in both a first direction from the first mentioned head end to the second head end and a second direction from the second head end to the first mentioned head end.

8. The information distribution system of claim 1, wherein the central information distribution center comprises:
an information request processing unit operable to process the request for narrowcast information;
an information source providing consolidated information to be distributed to one or more head ends including the first mentioned head end; and
a switching matrix operable to switch information onto at least one dedicated information channel to distribute the information to the one or more head ends.

9. The information distribution center of claim 8, wherein the information source comprises at least one of: a satellite farm capable of receiving content data from a satellite; and a video server capable of providing digital content data.

10. The information distribution system according to claim 9, further comprising an optical signal generation mechanism capable of generating the optical signal based on the content information using the dedicated information channels, wherein the optical signal generation mechanism comprises:
- a radio frequency (RF) based encoding mechanism, capable of modulating the content data of multiple channels onto one or more dedicated RF/microwave subcarriers to produce corresponding one or more RF signals;
- at least one optical modulator capable of up-converting the RF/microwave subcarriers carrying the RF signals onto the corresponding dedicated optical carriers carrying optical signals; and
- a wavelength division multiplexer capable of combining the dedicated optical carriers to produce the optical signal.

11. The information distribution system of claim 10, wherein each RF based encoding mechanism comprises:
- a multi-level encoder capable of modulating content data of at least one channel to produce at least one modulated signal; and
- a frequency division multiplexer capable of multiplexing a plurality of modulated signals, produced by a corresponding multi-level encoder, onto an RF/microwave carrier to produce a single RF signal.

12. The information distribution system of claim 8, wherein a dedicated information channel comprises at least one of an RF/microwave subcarrier at a subcarrier frequency and an optical channel at a channel wavelength.

13. The information distribution system of claim 8, wherein the switching matrix is operable to switch the narrowcast information onto one or more information channels that are dedicated to the node for narrowcast information transport.

14. The information distribution system of claim 13, wherein the switching matrix is operable to switch broadcast information, intended to be broadcast to all nodes connected to the head end and the second head end, onto to one or more information channels that are dedicated to broadcast content.

15. The information distribution system of claim 14, wherein the narrowcast information, encoded in subcarriers dedicated for narrowcast content, and the broadcast information, encoded in subcarriers dedicated for broadcast content, are encoded in a single optical channel.

16. The information distribution system of claim 15, wherein the narrowcast information, encoded in subcarriers dedicated for narrowcast content, and the broadcast information, encoded in subcarriers dedicated for broadcast content, are encoded in separate optical channels.

17. A central information distribution center, comprising:
- an information request processing unit operable to process a narrowcast information request;
- an information source providing content information to at least one downstream service provider location; and
- a switching matrix operable to switch the content information onto at least one information channel to distribute the content information to the service provider location, wherein the switching matrix switches narrowcast information requested by a node through a service provider location connecting to the node onto one or more information channels that are dedicated to carry narrowcast information for the requesting node in particular between the central information distribution center and the service provider location.

18. A method for distributing information, comprising:
- forwarding upstream to a central information distribution system, through a service provider system, a request for narrowcast content from a node connected to the service provider system;
- selecting narrowcast content responsive to the request;
- generating a signal operable to encode the narrowcast content using at least one carrier dedicated by the service provider system to the node for narrowcast information; and
- sending the signal to the service provider system.

19. A method for a central information distribution center, comprising:
- selecting narrowcast content to transmit to a requesting node that is in communication with a service provider site downstream from a central information distribution center;
- generating a narrowcast signal operable to encode the narrowcast content using at least one carrier assigned by the service provider site to the requesting node for narrowcast information content; and
- communicating the narrowcast signal to the service provider site for transmission to the requesting node.

* * * * *